(12) United States Patent
Holt

(10) Patent No.: US 10,942,709 B2
(45) Date of Patent: *Mar. 9, 2021

(54) HYPERPILER

(71) Applicant: Brian Holt, Incline Village, NV (US)

(72) Inventor: Brian Holt, Incline Village, NV (US)

(73) Assignee: Holtworks, LLC, Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,193

(22) Filed: Jun. 26, 2020

(65) Prior Publication Data

US 2021/0004209 A1    Jan. 7, 2021

Related U.S. Application Data

(63) Continuation-in-part of application No. 16/782,378, filed on Feb. 5, 2020, now Pat. No. 10,853,062.

(60) Provisional application No. 63/003,153, filed on Mar. 31, 2020, provisional application No. 62/879,497, filed on Jul. 28, 2019, provisional application No. 62/870,031, filed on Jul. 2, 2019.

(51) Int. Cl.
　　*G06F 8/30*　　　(2018.01)
　　*G06F 8/10*　　　(2018.01)
　　*G06F 8/41*　　　(2018.01)

(52) U.S. Cl.
　　CPC ............ *G06F 8/30* (2013.01); *G06F 8/10* (2013.01); *G06F 8/41* (2013.01)

(58) Field of Classification Search
　　CPC .......... G06F 8/20; G06F 8/30; G06F 8/34–36
　　See application file for complete search history.

(56) References Cited

U.S. PATENT DOCUMENTS

| | | | |
|---|---|---|---|
| 6,742,175 B1 * | 5/2004 | Brassard | G06F 8/71 717/107 |
| 7,779,386 B2 | 8/2010 | Seitz et al. | |
| 7,934,193 B2 * | 4/2011 | Rojer | G06F 8/24 717/106 |
| 8,448,132 B2 * | 5/2013 | Lochmann | G06F 8/35 717/104 |
| 8,756,046 B2 | 6/2014 | Linebarger et al. | |
| 8,898,103 B2 * | 11/2014 | Menday | G06F 16/367 706/55 |
| 9,880,817 B2 * | 1/2018 | Tanguy | G06F 8/73 |
| 9,880,922 B1 | 1/2018 | Koh et al. | |
| 10,025,801 B2 | 7/2018 | Kaufman et al. | |
| 10,048,946 B2 | 8/2018 | Krishnan et al. | |
| 10,078,501 B2 | 9/2018 | Narayanan et al. | |
| 10,318,251 B1 | 6/2019 | Darnell et al. | |
| 10,324,690 B2 | 6/2019 | Quali | |
| 2008/0082959 A1 | 4/2008 | Fowler | |
| 2008/0148229 A1 * | 6/2008 | Gownder | G06F 8/35 717/115 |

(Continued)

*Primary Examiner* — Duy Khuong T Nguyen
(74) *Attorney, Agent, or Firm* — Clause Eight IPS; Michael Catania

(57) ABSTRACT

An improved method for generating complex formal language documents from simple input values, reducing the barrier to formal communications. The techniques described may be applied to different domains to generate different types of documents requiring formal language. For illustration, this disclosure focuses on generating a computer program document as programming languages are among the most formal.

10 Claims, 11 Drawing Sheets

(56) References Cited

U.S. PATENT DOCUMENTS

2012/0185821 A1* 7/2012 Yaseen ............... G06F 8/35
717/105
2013/0271476 A1* 10/2013 Treiman ............. G06F 8/30
345/522

* cited by examiner

US 10,942,709 B2

HYPERPILER

CROSS REFERENCES TO RELATED APPLICATIONS

The present application is a continuation-in-part of U.S. patent application Ser. No. 16/782,378, "Hyperpiler," filed on Feb. 5, 2020. The present application also claims priority to U.S. Provisional Patent Application No. 62/870,031, "Method for Codeless Development Of Client-Server Computer Applications," filed on Jul. 2, 2019; to U.S. Provisional Patent Application No. 62/879,497, "Hypercompiler," filed Jul. 28, 2019; and to U.S. Provisional Patent Application No. 63/003,153, "Methods For Architecting A Computer Program Using Low-Code Construction," filed Mar. 31, 2020. Each of the foregoing is hereby incorporated by reference in its entirety.

COMPUTER LISTING

The instant application contains a Computer Program Listing which has been submitted via EFS-Web and is hereby incorporated by reference in its entirety. Said ASCII copy, created on Jun. 22, 2020, is named 46527_US_Computer_Program_Listing_Appendix.txt, and is 24,589 bytes in size.

BACKGROUND

Technical Field

The present invention generally relates to the templating and compiling of documents, including for example computer programs.

Description of Related Art

Many arts require a practitioner to learn a formal language in order to properly communicate. In computing, a practitioner must learn a formal programming language. In law, a practitioner must learn formal legal terminology. Such formal languages allow artful communication, but also create a barrier whereby a layperson must hire a formal language expert to artfully communicate ideas.

One approach to this barrier has been templates. In computing, templating engines have been built to generate relatively simple computer programs. In law, many template legal documents are available on the Internet with blanks for the layperson to complete with their specifics. However, these previous methods of templating have proven limited in their scope and usefulness. While these previous templates may produce simple documents, they typically have failed to produce the sophisticated documents needed to satisfy many complex real-world requirements.

BRIEF SUMMARY

The present invention reduces the barrier to formal communications by generating complex formal language documents from simple input values. The techniques described may be applied to different domains to generate different types of documents requiring formal language. For illustration, this disclosure focuses on generating a computer program document as programming languages are among the most formal.

In one aspect, a computer-implemented method automatically generates a document within a targeted domain from a specification for the document. The specification comprises a plurality of specification entities that comprise values to be included in the document. A domain ruleset is applied to convert the plurality of specification entities to a plurality of segment entities that comprise the values from the specification entities. The domain ruleset comprises predefined rules for processing specification entities for documents within the targeted domain. The plurality of segment entities are then processed to populate corresponding predefined segments from a segment set by inserting values from the segment entities into the predefined segments. The predefined segments comprise fragments of a document within the targeted domain and further comprise value insertion points for the insertion of values into the predefined segments. The segments are assembled according to the ruleset, thereby generating the document.

Another aspect of the present invention is a computer method and device that processes a declarative language into an imperative language.

Another aspect of the present invention is a computer method and device that processes a Turing-incomplete language into a Turing-complete language.

Another aspect of the present invention is a computer method and device that generates documents from macros.

Another aspect of the present invention is improved architecting for code generation, including deducing functionality from database column relationships.

Other aspects of the present invention are improvements in compiling, software domain engineering, software reuse, visual programming, Model-Driven Architecture (MDA), Model-Driven Development (MDD), low-code programming, no-code programming, codeless programming, templating, transclusion, document modeling, document processing, program synthesis, and related document generation fields.

Other aspects include components, devices, systems, improvements, methods, processes, applications, computer-readable mediums, and other technologies related to any of the above, including the steps taken alone or in combinations.

BRIEF DESCRIPTION OF THE DRAWINGS

Having briefly described the present invention, the above and further objects, features and advantages thereof will be recognized by those skilled in the pertinent art from the following detailed description of the invention when taken in conjunction with the accompanying drawings.

DETAILED DESCRIPTION OF SOME EMBODIMENTS

Figure 1:
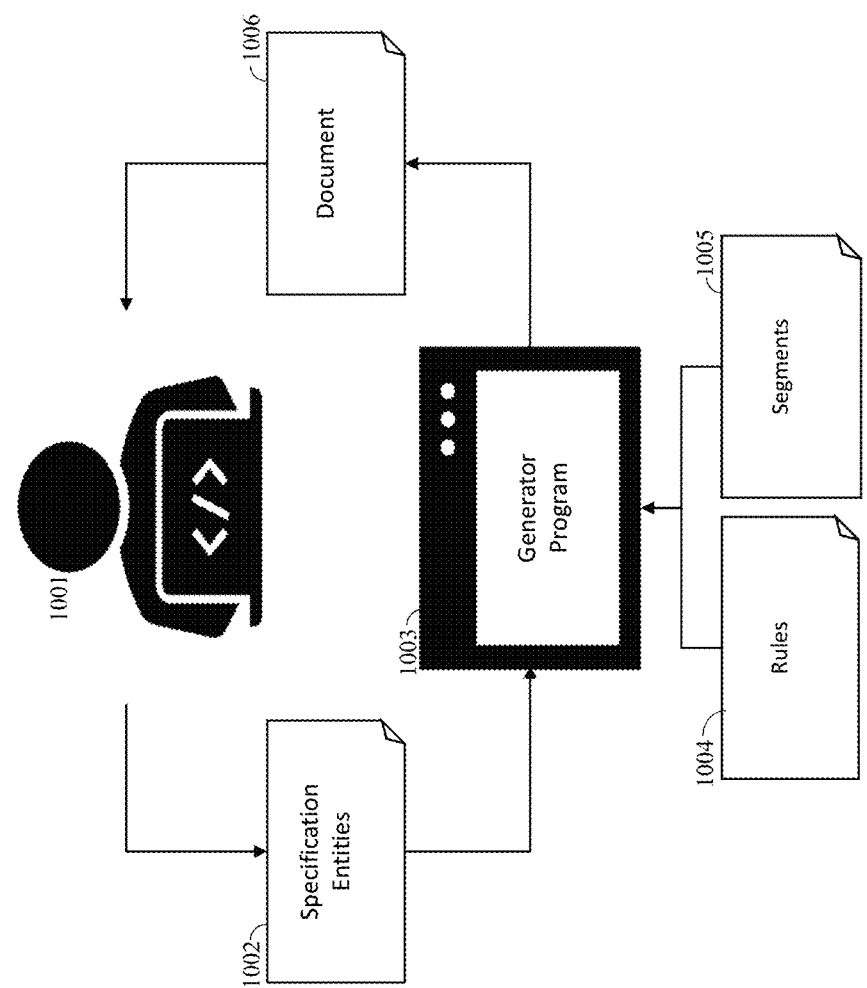
FIG. 1 illustrates a development cycle for one embodiment.

FIG. 1 illustrates an exemplary development cycle in which a constructor 1001 creates a document 1005. The constructor 1001 (e.g. a person or computer) creates a specification 1002 for a desired document in a targeted domain and inputs the specification into the generator program 1003. The specification 1002 describes the information that is specific to the final document, but may omit information that is implied, inherent or otherwise defined by the domain. Such implied information is captured by a corresponding set of rules 1004 and set of segments 1005 for the domain, and also by the generator program 1003. The segments 1005 are domain-specific genericized components used to build documents within the domain of interest. The generator program 1003 inserts values from the specification entities 1002 into the segments 1005. The rules 1004 are also domain-specific and define how to extract the information from the specification and assemble it into a form that can be used to insert values into the segments, including assembly of the filled segments into the final document 1006 for the domain of interest. The generator program 1003 loads the ruleset 1004 and the segment set 1005 that are relevant to the document's targeted domain. The generated program 1003 applies the ruleset to the specification entities to insert specification values into segments and assemble the segments into the generated document 1006. The generator program 1003 outputs the generated document 1006 to the constructor.

Figure 2:
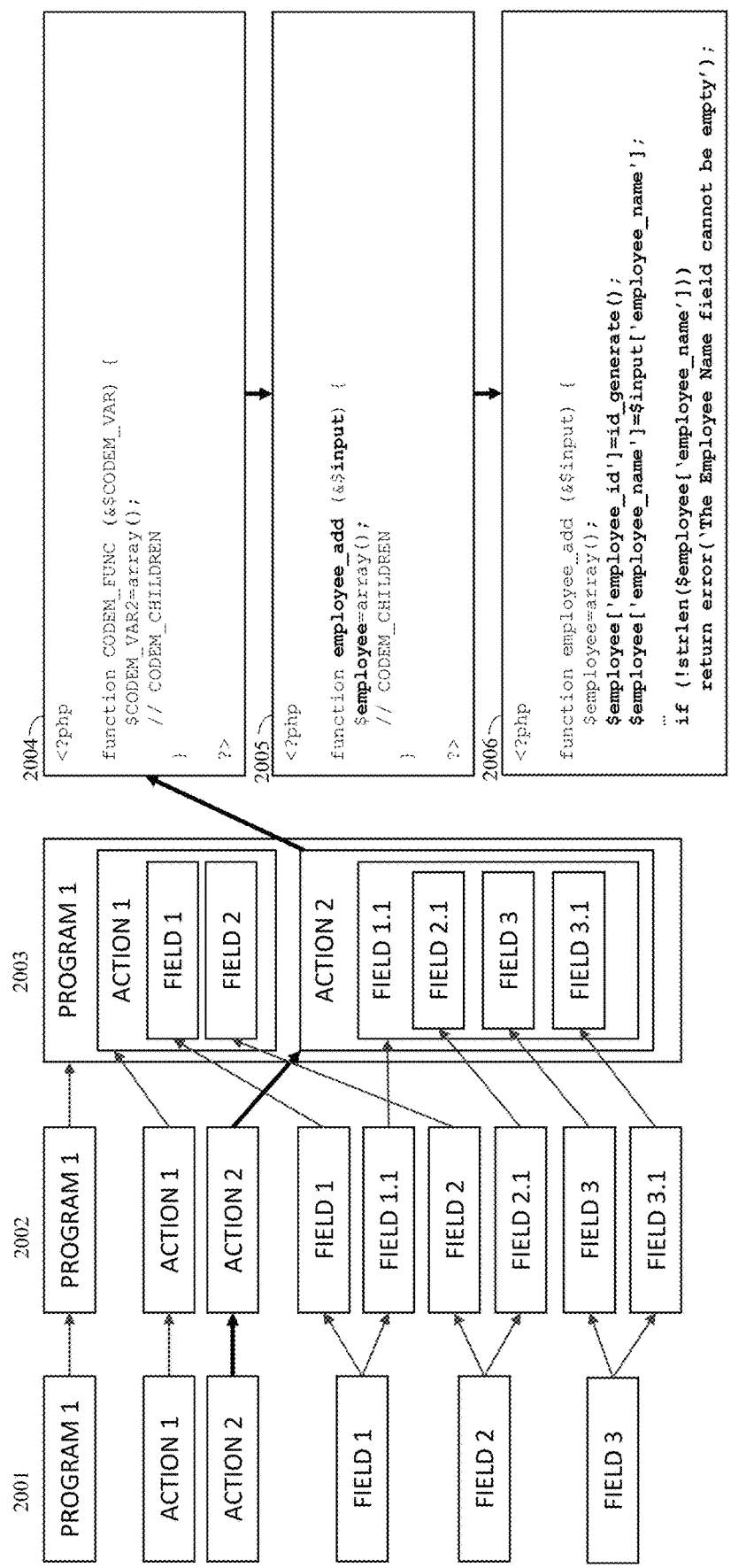
FIG. 2 illustrates one embodiment of generating a PHP program document.

FIG. 2 illustrates one embodiment for generating a PHP program. The generator loads specification entities in the first column 2001. The specification entities may not be suitable for use directly with predefined segments of the PHP program, so the generator applies the ruleset to the specification entities to modify the existing entities, thus generating new entities in the second column 2002 that are more amenable for use with predefined PHP segments. These are referred to as segment entities 2002. The generator nests these segment entities in the third column 2003. The generator loads a PHP segment 2004 corresponding to a segment entity. The generator pairs the segment to the entity and replaces segment variable insertion points with entity values, as shown in block 2005. The generator replaces the segment's child insertion point with the nested child segments, as shown in block 2006.

Figure 3:
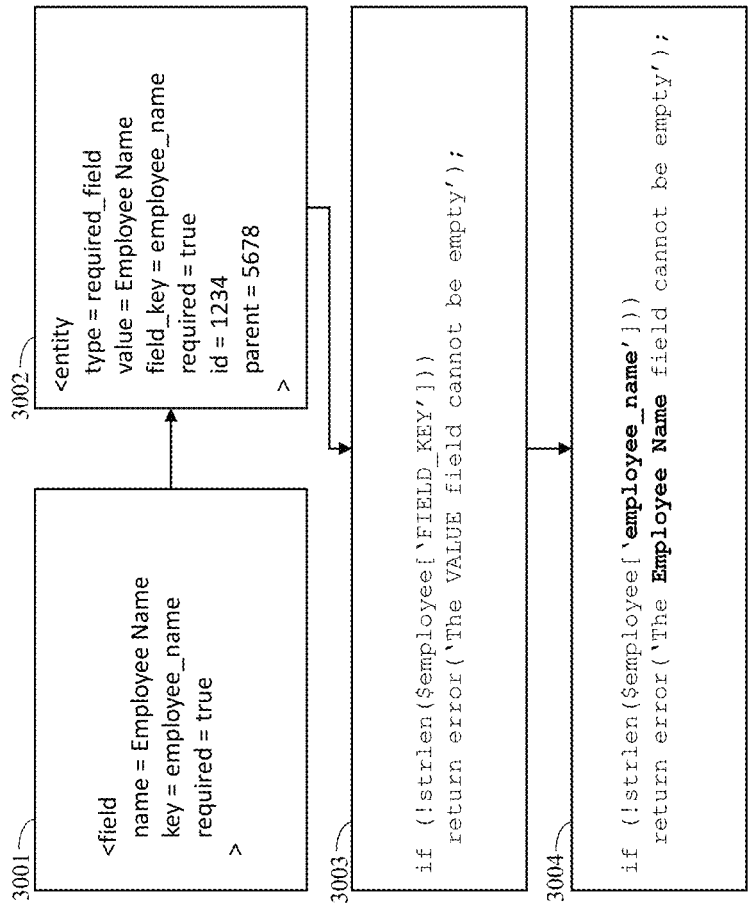
FIG. 3 illustrates one specification entity's values processed in one embodiment.

FIG. 3 illustrates how values from one specification entity are processed by one embodiment of the generator. A specification entity 3001 describing a field is input into the generator. The generator applies the ruleset to convert the specification entity 3001 into a corresponding segment entity 3002. The entity 3002 is paired with a segment 3003 based on its type value. The values in the segment entity 3002 replace the variable insertion points in the segment 3003 to form a string 3004 that will be incorporated into the document.

Figure 4:
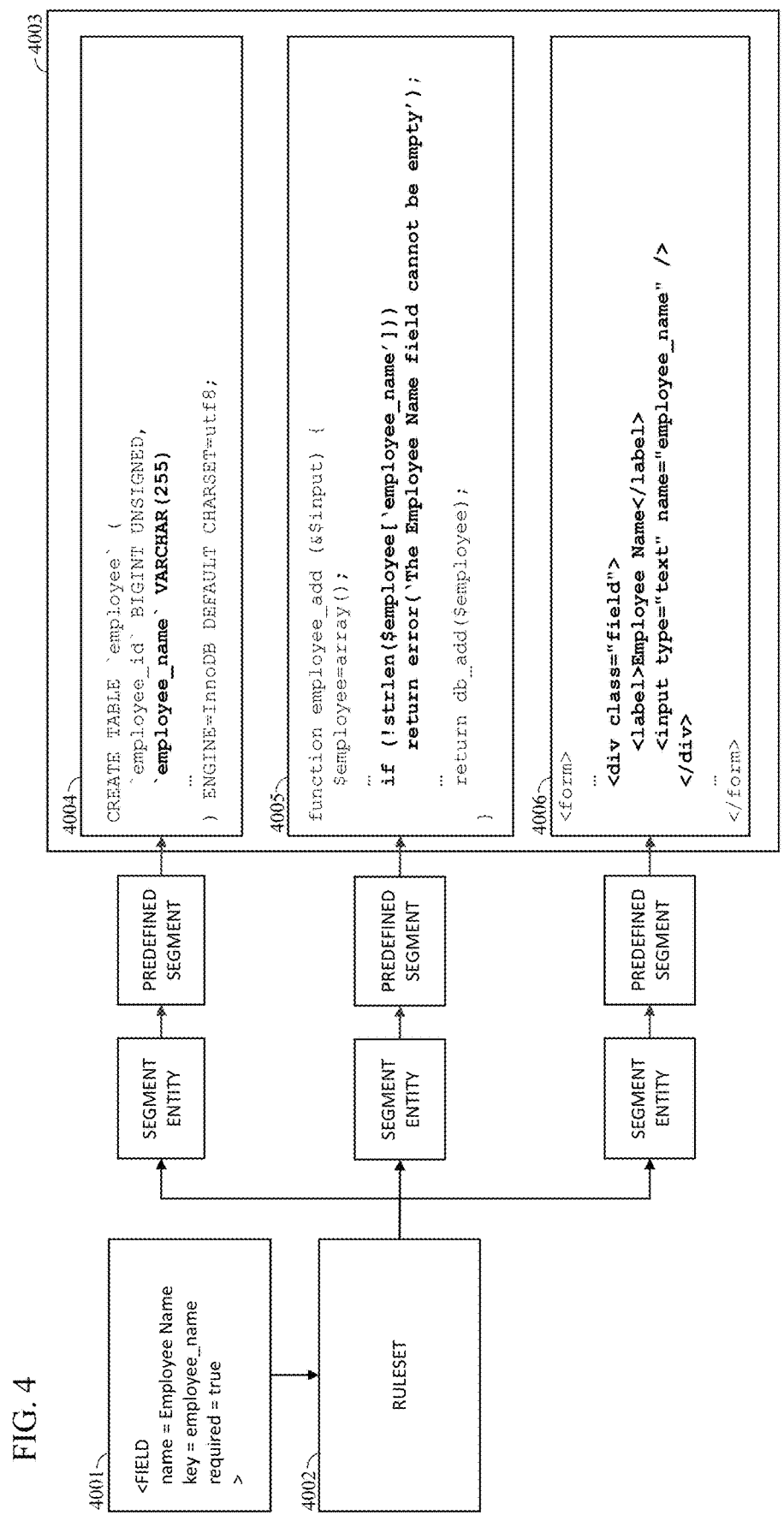
FIG. 4 illustrates one specification entity processed into multiple document segments in one embodiment.

FIG. 4 illustrates a single specification entity (or "specity" for convenience) processed into multiple segments in the generated program. The field specity 4001 includes a name attribute, a key attribute, and a required attribute. The field specity is processed by the ruleset 4002 to generate the program document 4003. The field specity generates a segment 4004 of SQL code to create a corresponding database column. The field specity generates a segment 4005 of PHP code to capture and validate corresponding user input. The field specity generates a segment 4006 of HTML code to display a corresponding input box. Each of these segments 4004-4006 is generated using the same process. The ruleset 402 is applied to the specity 4001, converting the specity 4001 into three entities (segment entities) each of which contains certain values. Each segment entity has a corresponding predefined segment with placeholders for the values, and values from the segment entity are used to populate the corresponding predefined segment, thus yielding segments 4004-4006.

Figure 5:
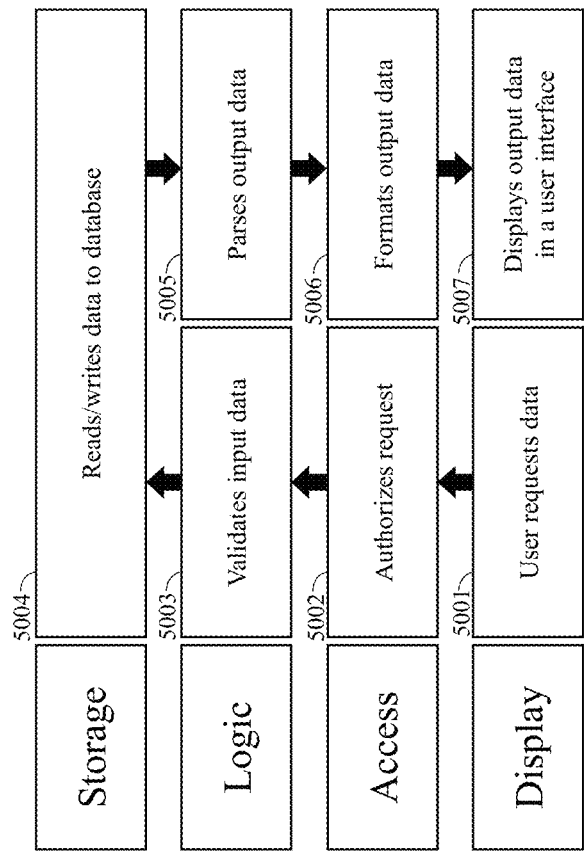
FIG. 5 illustrates a SLAD architecture flow chart.

FIG. 5 illustrates a SLAD (storage, logic, access, display) architecture flow chart. Each row represents a layer in SLAD. A user requests 5001 data at the display layer. The program authorizes 5002 the request at the access layer. The program applies business logic to validate 5003 the input data at the logic layer. The storage layer reads/writes 5004 data to the database and sends the output data back through the stack. The business logic layer parses 5005 the output data. The access layer formats 5006 the output data (e.g. JSON for an API). The program displays 5007 the output data to the user at the display layer.

Figure 6:
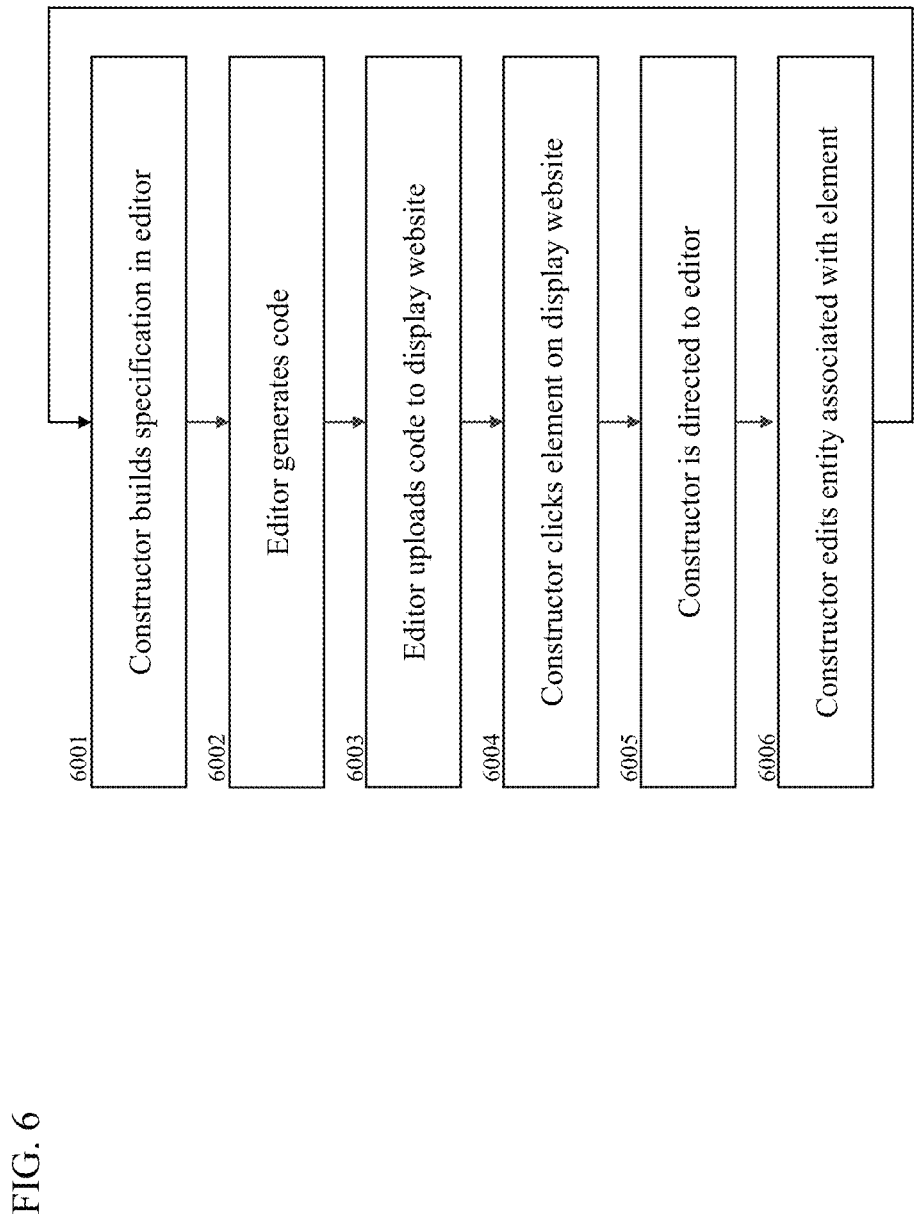
FIG. 6 illustrates an exemplary editing cycle for a generated HTML document.

FIG. 6 illustrates an exemplary editing cycle for a generated web document. At 6001 the constructor builds a specification in an editor program. The editor program is optionally a website or an application running on the constructor's computer. At 6002, the editor uses the specification to generate code, for example using the processes described herein to convert a specification into a generated document. The code for a web document is typically HTML or a scripting language that outputs HTML (e.g. PHP or Python). At 6003, the editor program uploads the code to web server to display as a website. At 6004, the constructor clicks on an element on a webpage to initiate editing the part of the specification associated with that element. The clicking optionally involves alt-clicking or control-clicking, or optionally involves a browser plugin or JavaScript to enable such an edit click. At 6005, the constructor is directed to the editor program where the constructor edits the entity or entities associated with that element 6006. The webpage may be updated in real-time.

Figure 7:
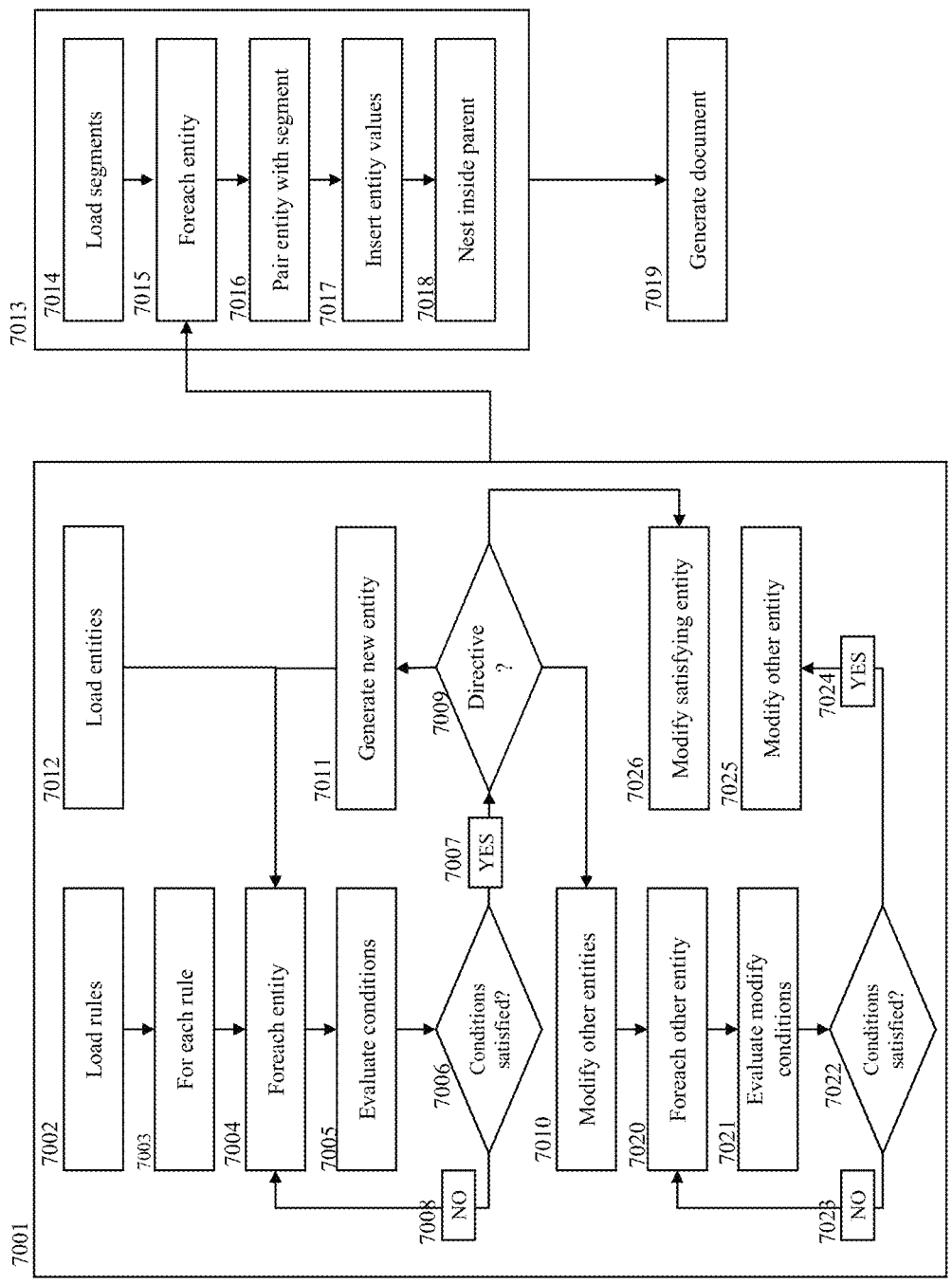
FIG. 7 is a flow chart of one embodiment of a generator.

FIG. 7 illustrates one embodiment of a hyperpiler cycle. The first stage 7001 receives a set of specification entities and then processes those specification entities into the set of segment entities for use in the second stage 7013. The generator loads the ruleset 7002 for the targeted domain and specification entities 7012. The generator iterates over each rule in a loop 7003. Within the rule loop, the generator iterates over each entity in a loop 7004. The generator evaluates if the selected entity satisfies the conditions of the selected rule 7005. If not, the generator iterates to the next entity 7008. If yes, the generator executes the rule commands 7007. The rule has three possible directives 7009: modify the values of the satisfying entity 7026, modify the values of one or more other existing entities 7010, or generate a new entity 7011. The generator optionally may perform combinations of these directives. Generated entities are pushed to the end of the entity loop for rule processing. Should the rule direct to modify one or more other existing entities 7010, the generator starts a new loop to iterate over each entity 7020 to evaluate which other entities satisfy the rule's modify conditions 7021. If an entity does not satisfy the modify conditions, then the loop iterates 7023. If an entity does satisfy the modify conditions 7024, then the values of that entity are modified according to the rule's commands 7025. At the end of this process 7001, the set of entities as defined in the specification (i.e., specification entities) has been converted to a set of entities (i.e., segment entities) that may be used with predefined document segments.

The second stage 7013 handles the segments. The generator loads the segment set 7014 (i.e., the set of predefined segments) for the targeted domain. The generator takes the processed array of entities (segment entities) and iterates over each one in a loop 7015. The generator pairs each applicable segment entity with a segment 7016. The generator inserts values from the segment entity into the corresponding segment 7017. The generator nests child segments inside parent segments 7018 according to the values of the entities paired with the segments. The generator forms the document from the nested segments 7019.

Figure 8:
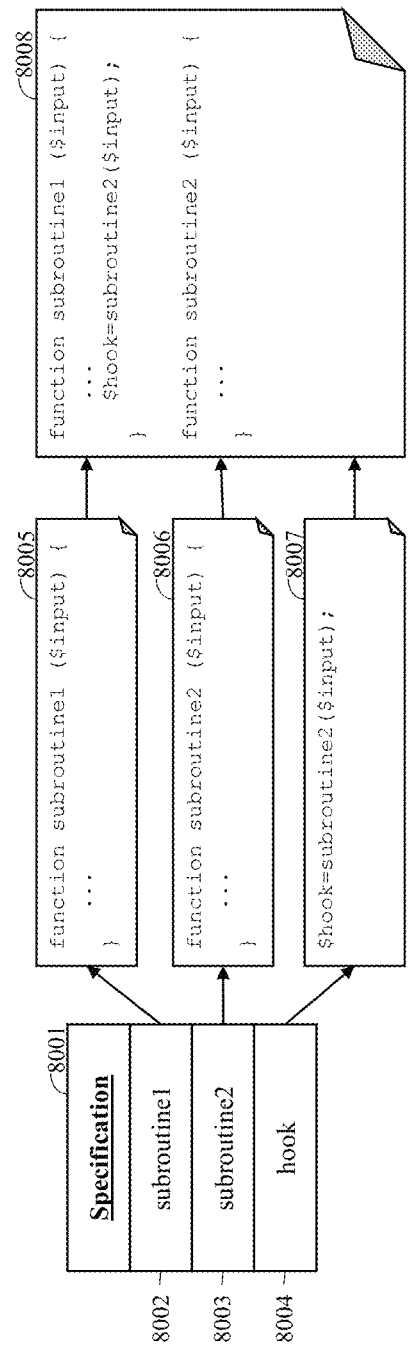
FIG. 8 illustrates a hook entity linking two subroutines.

FIG. 8 illustrates processing entities representing two subroutines connected by a hook into a computer program document. Block 8001 represents a specification describing a program. Block 8002 represents a first specification entity describing a first subroutine. Block 8003 represents a second specification entity describing a second subroutine. Block 8004 represents a third specification entity describing a hook between the first subroutine and second subroutine.

Block 8005 represents a subroutine code segment generated from the first specification entity 8002. Block 8006 represents a subroutine code segment generated from the second specification entity 8003. Block 8007 represents a hook code segment generated from the third specification entity 8004. At block 8009, the code segments are combined. The hook code segment 8007 is nested inside the first subroutine code segment 8005, such that executing the first subroutine will also execute the second code subroutine.

Figure 9:
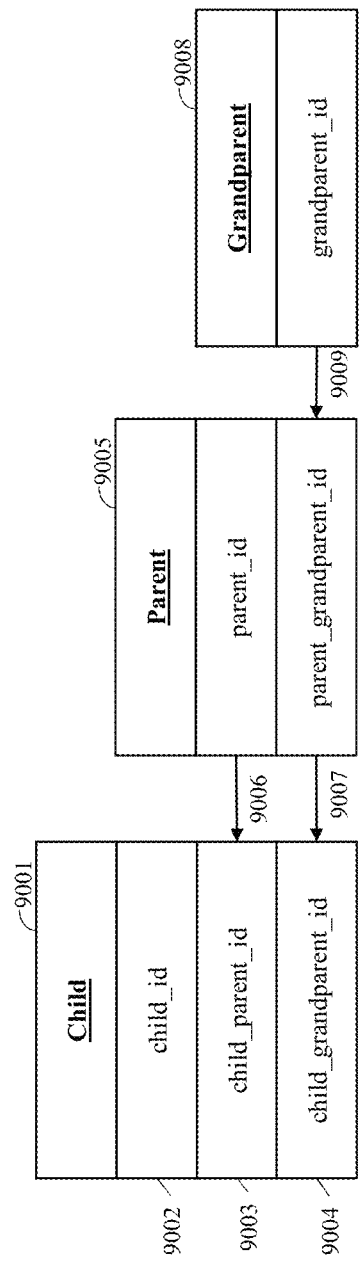
FIG. 9 illustrates the columns in a child table, parent table, and a grandparent table.

FIG. 9 illustrates an exemplary specification for a database containing a child, parent, and grandparent table. Each of the blocks 9001-9009 represents a specification entity within this database specification. Block 9001 represents the child database table. Block 9002 represents the unique identifier column for the child table. Block 9003 represents a column storing a parent unique identifier in the child table. Block 9004 represents a column storing a grandparent unique identifier in the child table. Block 9005 represents a parent database table. Block 9006 represents a column storing the unique identifier for the parent table. Block 9007 represents a column storing a grandparent unique identifier in the parent table. Block 9008 represents a grandparent database table. Block 9009 represents a column storing the unique identifier for the grandparent table. The value of the child table's grandparent identifier column 9004 is filled from the parent table's grandparent identifier column 9007 from the row where the child table's parent identifier 9003 matches the parent table's identifier 9006.

Figure 10:
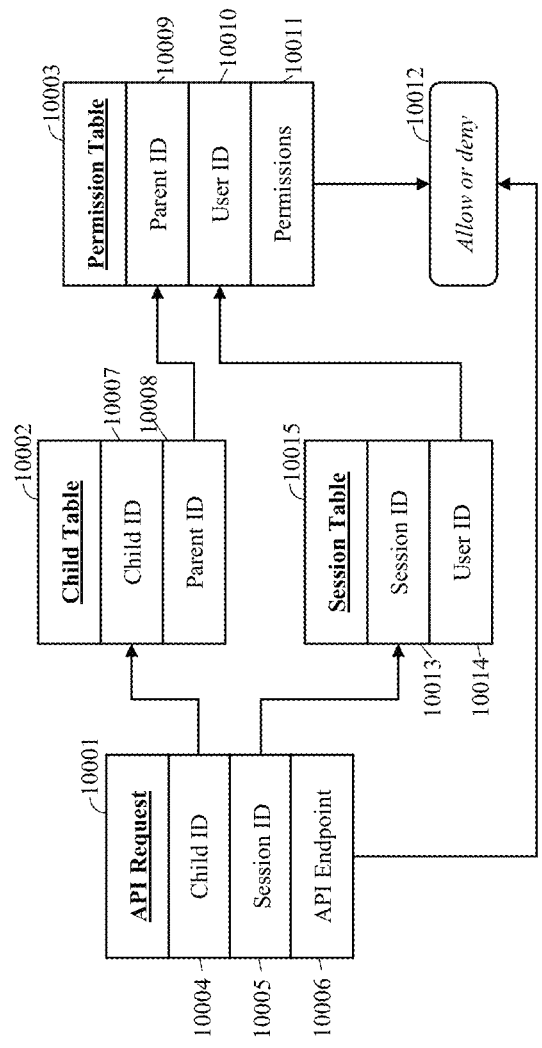
FIG. 10 illustrates a child-parent API authorization request.

FIG. 10 illustrates an exemplary specification for a child-parent API authorization. Each of the blocks 10001-10015 represents a specification entity within this specification. Block 10001 represents data sent via API request. The API request contains a Child ID value 10004, a Session ID value 10005, and an API Endpoint value 10006. The API Child ID 10004 correlates to the Child ID column 10007 in the Child Table 10002. The API Session ID 10005 correlates to the Session ID 10013 in the Session Table 10015. The program uses the correlated Parent ID column value 10008 and the correlated User ID column value 10014 value to look up the Permissions column 10011 in the permission table 10003 correlating to those two values. The API program then uses the Permissions value 10011 to allow or deny 10012 the user's request to access the given API Endpoint 10006.

Figure 11:
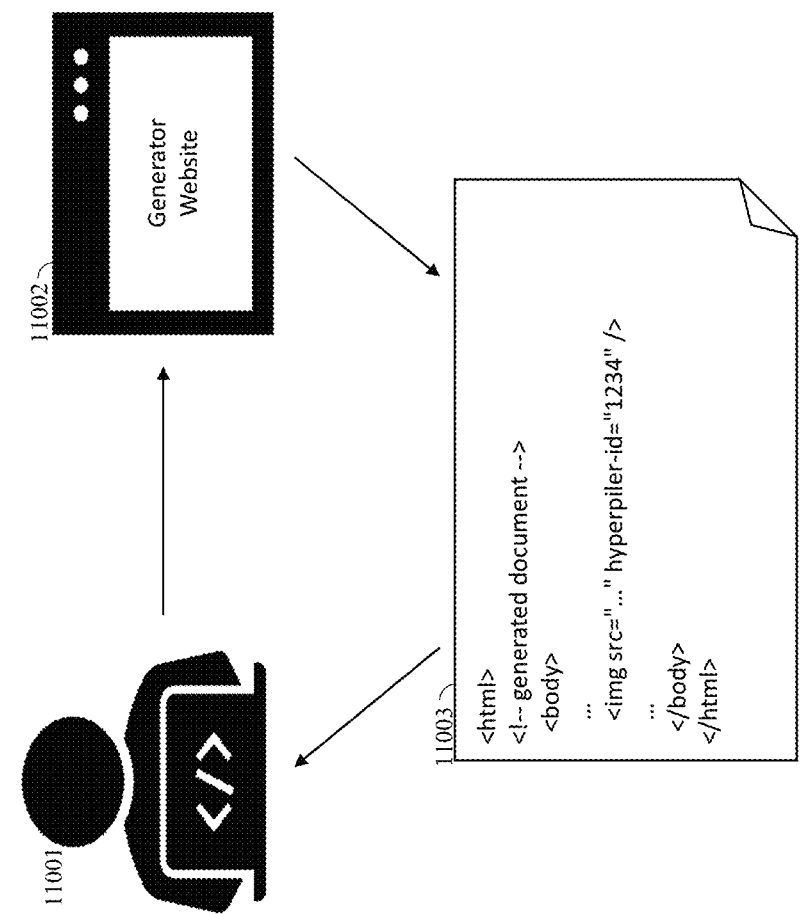
FIG. 11 illustrates a WYSIWYG editing cycle for an HTML document.

FIG. 11 illustrates one embodiment of a WYSIWYG editing cycle for an HTML document. The constructor 11001 opens a web browser window to manipulate specification entities in the generator website 11002. The generator website generates an HTML document 11003 in the generated website. The constructor opens a browser window to view the generated website. The constructor alt-clicks on an image element in the generated HTML document, which directs the constructor's browser to open the generator website to the webpage for editing the specification entities associated with that HTML image element. The constructor manipulates those specification entities and starts a new cycle. Preferably, this cycle comprises three computing devices: one for the constructor, one for the generator website, and one for the generated website. Alternatively, this cycle comprises two computing devices: the constructor's browser and generated website share a computing device, and the generator website resides on a second computing device. Alternatively, this cycle comprises two computing devices in different configuration: the constructor's computing device, and both the generator website and generated website share a second computing device. Alternatively, all three programs run on the developer's computing device.

General Definitions

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Architect, in the present invention, is a person who develops components of a generator.

Attribute provides additional information about an entity. Each attribute is a key and corresponds to a value, both of which are typically strings.

Code snippet is a block of one or more program instructions.

Column is a set of data values of a particular simple type, one value for each row of the database.

Comma Separated Values (CSV) file is a delimited text file that uses a comma to separate values. Each line of the file is a data row.

Compiler is a computer program that translates a series of instructions written in one programming language into a different programming language. An interpreter is a special case compiler that compiles code upon execution or "on the fly." A transpiler is a special case compiler that typically converts code designed for one computing system to code designed for a different computing system.

Constructor, in the present invention, is a person or computer using a generator.

CRUD is an acronym for the common computer data manipulation tasks of create, read, update, delete.

Database is an organized collection of data, generally stored and accessed electronically from a computer system.

Developer is a person who creates a computer program, either manually or through a generator.

Document, in the present invention, is the string generated by the generator program. The document is optionally a computer program, legal document, another computer-readable document, or another human-readable document. The document is optionally one file or multiple files.

Document Store is a computer data storage system designed for storing, retrieving and managing document-oriented information. Examples include CouchDB, Elasticsearch, and MongoDB.

Entity is a group of values relating to conceptual object. In computer programming, an entity may also be referred to as a tuple, array, object, or row.

Field is a single variable, typically a string, used in the input or output of a computer program. One cell of one row in a database constitutes a field. A plurality of fields are typically used for the input of an API program.

Generator is a computer program that generates a document, as described herein.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JavaScript Object Notation (JSON) is an open standard file format, and data interchange format, that uses human-readable text to store and transmit data objects consisting of attribute-value pairs and array data types.

Key-value Store is a computer data storage system designed for storing, retrieving, and managing associative arrays. Examples include Redis, Riak, AWS Dynamo, and Memcached.

Low-code, or "codeless" or "no-code," describes an array of techniques for creating computer programs with little or no knowledge of the underlying computer commands.

Modeling Language is an artificial language that can be used to express information or knowledge or systems in a structure that is defined by a consistent set of rules. The rules are used for interpretation of the meaning of components in the structure. Modeling languages are typically uncontrolled.

Mustache is a group of open-source templating engines available at mustache.github.io.

Nunjucks is an open-source templating engine maintained by the Mozilla Foundation available at mozilla.github.io/nunjucks/.

PHP is a scripting language that allows developers create dynamically generated webpages, and is used for server-side programming.

Platform is the combination of a computer's architecture, operating system, programming language, runtime libraries and GUIs.

Program instruction is an instruction for a computing device to execute a certain task.

Row, in a database, represents a single, implicitly structured data item in a table. In various programming contexts, a row may also be called an array, a data object, a tuple, an entity, an element, or a hash.

Storage-Logic-Access-Display (SLAD) is a style of program architecture, typically used in web service applications.

Segment, in the present invention, is a string (or associated group of strings) to be incorporated into the generated document.

Specification is a formal description of a document comprising a plurality of entities. Typically a specification is written in a declarative language, and lacks control structures or programming statements.

Structured Query Language (SQL) is a language for managing data held in a relational database management system.

String is a sequence of characters.

Subroutine is one or more program instructions that performs a specific task, packaged as a unit.

Tab Separated Values (TSV) file is a delimited text file that uses a tab to separate values. Each line of the file is a data row.

Table is a collection of related data held in a table format within a database, consisting of columns and rows.

Velocity is an open-source templating engine maintained by the Apache Foundation, available at velocity.apache.org.

Web Browser is a complex software program, resident in a client computer, that is capable of loading and displaying text and images and exhibiting behaviors as encoded in HTML (HyperText Markup Language) from the Internet, and also from the client computer's memory. Major browsers include Microsoft Internet Explorer, Microsoft Edge, Apple Safari, Mozilla Firefox, and Google Chrome.

Web Server is a computer that sends requested data to client computers over a network.

Hyperpiler

One aspect of the present invention is an engine and architecture that separates specifications, loops, conditions, and strings. This is more scalable to generate large, complex documents (such as computer programs) compared to conventional templating languages which typically are designed to mix loops, conditions, and strings.

Preferably, the present invention contains loops in the generator program. Preferably, the generator loads the linear ruleset at once together. Preferably, the generator loads a separate linear set of segments at once together, each segment treated as strings and not evaluated. Preferably, rules combined with entities arrange the segments. This separation has numerous advantages.

For example, one embodiment of the present invention reproducing the conventional template script examples above would consist of the following ruleset, segment set, and generator program:

Example Ruleset:

```
////////////////////////////////
if (firstcycle) true
do add entity
set id ull
set segment ul
set where output.html
////////////////////////////////
if type blog
if blog_public 1
do add entity
set segment li
set where ull
set title BLOG_TITLE
set order 1
////////////////////////////////
if type blog
if blog_public 1
do add entity
set segment bloghtml
set where ull
set order 2
```

Example Segment Set:

```
<!-- ul -->
<ul>CHILDPOINT</ul>
<!-- li -->
<ul>TITLE</ul>
<!-- bloghtml -->
<div>
    <b>More about this blog: </b>
    <i>CHILDPOINT</i>
</div>
```

Example Portion of the Generator Program:

```
<?php
    foreach ($rules as $rule) {
        foreach ($entities as $entity) {
            /* apply rules to entities here */
        }
    }
    /* save generated string to file here */
?>
```

In this embodiment, the three distinct components combined are more complex than one conventional template script. However, individually, the distinct ruleset and distinct segment set are each more focused than a conventional template script. This effectively offloads the complexity from the two customized components to the standardized generator component, allowing the custom components to more easily scale up for complex documents. The generator component preferably remains the same for all documents of all domains.

The present invention allows for linear (non-nested) entities in the specification. Preferably, specification entities reference each other in designated values.

The present invention allows for a linear (non-nested) rules in the ruleset. Preferably, the generator contains a loop wherein each rule is iteratively applied to each entity.

The present invention allows for a linear (non-nested) list of segments. Preferably, segments do not reference other segments. Rules, and rules combined with entity values, preferably determine segment arrangement (including ordering and nesting) and place segments in any desired arrangement. This allows an architect to rearrange how segments will nest by changing the rules, without having to modify the segments themselves. This also allows a constructor to change how segments are arranged by changing the specification entity values, without having to modify rules or segments.

The present invention allows for pure segments, containing only strings which will be incorporated into the generated document (excepting valpoints and childpoints, discussed later). Preferably segments do not contain a templating language. This saves architects the burden of learning and debugging a templating language.

The present invention allows for two parties to semi-independently architect a ruleset and a segment set.

The present invention allows for easy translation. One generator with one specification and one ruleset optionally uses multiple sets of segments to generate multiple equivalent documents in different languages (human or program).

The present invention preferably has a predetermined, finite number of entity loops, as opposed to the conventional templates unlimited number of entity loops. This allows for certain rule loop optimizations. Likewise, this overcomes a version of the Halting Problem that affects conventional templating engines.

Specification Entities (Specities)

The generator loads a specification describing aspects of the document to be generated. The specification comprises entities, or "specities" for short.

Preferably these entities are in entity-attribute-value form, such that each entity comprises a plurality of attribute-value pairs. Each attribute names an aspect if the entity and the corresponding value describes that aspect. Each entity comprises values which are typically strings, integers, or decimal numbers. In other words, the specities are preferably a numerated array of associative arrays.

Each specity represents an aspect of the document to be generated. An example aspect of an API computer program would the name of an endpoint. An example aspect of a legal document would be the name of a signing party. The types of entities, attributes, and values are "domain-specific" as they will reflect the domain of the document for which they are intended.

The specification is preferably "uncontrolled" and does not need to be evaluated for conditional or loop commands such as if, else, for, foreach, and while. Loops preferably reside in the generator program. Conditions preferably reside in the domain ruleset. Specities satisfy (or fail to satisfy) rule conditions in the domain ruleset.

The specification entities syntax preferably comprises a method for distinguishing each of the plurality of entities; a method for distinguishing each attribute; a method for assigning each attribute a value; and a method for assigning each attribute-value to one or more of the plurality of entities. The specities are optionally embodied in a number of different syntaxes.

In one embodiment, the ruleset is in a linear XML-like syntax:

```
<specityType1 name="Hello" size="100">
<specityType2 name="Goodbye" order="2" color="blue">
```

In one embodiment, the ruleset is in a nested XML-like syntax:

```
<specityType1>
    <name>Hello</name>
    <size>100</size>
</specityType1>
<specityType2>
    <name>Goodbye</name>
    <order>2</order>
    <color>blue</color>
</specityType1>
```

In one embodiment, the ruleset is in a JSON-like syntax:

```
[ {
    "specity": "specityType1",
    "name": "Hello",
    "size": "100"
},
{
    "specity": "specityType2",
    "name": "Goodbye",
    "order": "2",
    "color": "blue"
}
]
```

In one embodiment, the ruleset is in a program variable syntax (for example, PHP):

```
$entities=array(
   array(
      'specity'=>"specityType1",
      'name'=>"Hello",
      'size'=>"100"
   ),
   array(
      'specity'=>"specityType2",
      'name'=>"Goodbye",
      'order'=>"2",
      'color'=>"blue"
   )
);
```

In one embodiment, the ruleset is in a list of variables syntax:

```
$specity1='specityType1';
$specity1name='Hello';
$specity1size='100';
$specity2='specityType2';
$specity2name='Goodbye';
$specity2order='2';
$specity2color='blue';
```

In one embodiment, the ruleset is in a natural language-like syntax:

```
specity1 is a specityType1.
The name of specity1 is Hello.
The size of specity1 is 100.
specity2 is a specityType2.
The name of specity2 is Goodbye.
The order of specity2 is 2.
The color of specity2 is blue.
```

In one embodiment, the ruleset is in a CSV-like syntax (preferably with a specified order for attributes for each type of entity):

```
specityType1,Hello,100
specityType2,Goodbye,2,blue
```

In the preferred embodiment, the ruleset is in a specialized syntax with a first divider string separating entities (e.g. forward slashes), a second divider string for separating attribute-value pairs (e.g. newline), and a third divider string for separating the attribute and values in a pair (e.g. space):

```
//////////////////
type specityType1
name Hello
size 100
//////////////////
type specityType2
name Goodbye
order 2
color blue
```

In one embodiment, the ruleset is in an SQL-like syntax (e.g. from a SHOW CREATE TABLE command):

```
CREATE TABLE blog (
   blog_id BIGINT,
   blog_public BIT,
   blog_title VARCHAR(255) NOT NULL,
);
```

Note that SQL is one of many embodiments with an irregular entity-attribute-value syntax. In such cases, the generator preferably parses and normalizes the entities. For example, the blog_title column above is a mix of attributes and values in inconsistent syntaxes. That column entity translated to a more consistent format would be:

```
<column name="blog_title" table="blog" datatype="char" minLength="1" maxLength="255" allowNull="false">
```

The specification is optionally encoded in UML or DDL.

Preferably, in XML-like syntaxes, the "tag" is considered an implicit type attribute.

The simplicity of the specities allows them to be easily stored in a database. Preferably, specities are stored in a relational database wherein each specity is a database row, each type of specity is a database table, each allowable attribute is a database column, and each attribute value is cell. In practice, a database storing multiple programs will have additional columns identifying to which program each specity belongs. An example in SQL is:

```
INSERT INTO 'specityType1' SET 'id'=1, 'name'="Hello", 'size'="100";
INSERT INTO 'specityType2' SET 'id'=2, 'name'="Goodbye", 'order'="2", 'color'="blue";
```

Alternatively, the specities are stored in a key-value database, entity-attribute-value database, document database, no-SQL database, or other similar storage system.

By storing specities in a database, the developer can utilize a number of tools to manipulate the specities, including graphical user interfaces and websites connected to the database. The data objects retrieved from the database are optionally inputted directly into the present invention, or optionally the data objects are converted to a textual representation prior to input.

In one embodiment, specities contain values relating to desired control structures in the generated program. Such specities should not be construed as making the specification controlled. For example, a specity may represent an if concept that is processed into an if ( ) { } code statement in the generated program. The generated program evaluates the if statement and conditionally executes the corresponding instructions. However, the generator program preferably treats the if specity just as any other specity.

Specities contain string values to be incorporated into the generated document. Typically, these strings are short names or numbers. For computer program documents, some specity value strings are optionally program instructions in a given programming language. Such programming language is preferably not executed by the generator, only incorporated into the generated program.

Alternatively, specities are encoded as variables, objects, tuples, arrays, or similar entities within a programming language. Alternatively, specities are embodied next to general purpose code that is to be incorporated into the generated program document. The encoding of the specities in a general purpose programming language and/or the addition of general purpose code should not be construed as negating the uncontrolled nature of the specities.

Alternatively, a specity value is an array.

Alternatively, a specity value is a string comprising a list of values, each value separated by a divider string.

In alternative embodiments, an entity's attributes and values are not syntactically contained within the entity string in the specification, rather, attributes and values are linked through identifiers.

In prior patent applications, specification entities were referred to as "initial entities" or "codecepts." Here, the term "specification" has replaced the term "initial" to better convey the function of the entity. The term "specity" is used here instead of "codecept" in order to accommodate embodiments where the specification describes non-computer-program documents. Optionally, specification entities are called "specification elements."

Domain Ruleset

The domain ruleset contains a list of rules for processing the specification entities. The rules perform two main functions: modify values for existing entities and use existing entity values to generate new entities. The ruleset especially focuses on the identification values of the entities, the parent values of the entities, the order value of the entities, and the segment type values of the entities.

The domain ruleset is "domain-specific" as it is limited to generating a program that functions in a certain predetermined way. Typically, programs in a domain will be designed to run on the same type of computing device, take input in the same format, and push output in the same format. Example domains include platformer games, read-eval-loop (REPL) command line interface (CLI) scripts, web service application programming interfaces (API), and mobile applications.

Optionally, a domain ruleset generates multiple related computer program documents. Optionally, the generated programs are executed on different devices. For example, a domain ruleset generates both a server program and a client program. In one embodiment, for generating a client-server domain, the domain ruleset constructs a PHP program to run on a web server, HTML files, a program to run on iOS devices, and a program to run on Android devices. In this embodiment, the PHP, HTML, iOS, and Android programs share similar features that mirror the functions of the server program, thus grouping all of these programs under one domain is practical.

Optionally, the generator applies multiple rulesets to a specification to generate multiple related documents. For example, generating a server program from one ruleset and a corresponding client program from another ruleset.

In the preferred embodiment, the generator has access to multiple domain rulesets. The desired domain ruleset (or rulesets) is preferably separately inputted into the generator. Alternatively, the generator automatically determines the desired domain ruleset by analyzing the specification entities and attributes for specific characteristics. Alternatively, the desired domain ruleset is selected through explicit specification entities. Alternatively, the generator has access to only one domain ruleset and no selection is needed.

Typically, a constructor will create a specification for a targeted ruleset. The constructor generally knows the types of entities and values the ruleset accepts and generally how they affect the generated document. For example, a constructor building a specification for a medical report must generally know that the report needs patient blood pressure, weight, and height information, and the constructor must generally know and how to form that data into the appropriate specification entities. Preferably, the constructor generates the specification using an editor program that assists the constructor in creating the appropriate entities for the ruleset. Optionally, the editor program has a portion of the ruleset built into it, such that it automatically generates related entities upon creation of a specification entity.

Rules, logic, and conditions that are programmed into the generator program itself are also considered part of the selected domain ruleset.

Each rule has at least two components: conditions and commands. A rule is applied to an entity by first evaluating if the entity satisfies the rule conditions. If conditions are not satisfied, the rule application stops. If conditions are satisfied, the rule's commands are executed.

Conditions typically involve string comparisons of entity values. For example, a condition might be "if the entity's type value equals action" or "if the entity's action type value does not start with add." Conditions are optionally compounded such that an entity must satisfy multiple conditions.

Commands typically involve either generating new entities comprising values from the applied entity, modifying values for the applied entity, or modifying values for other entities using the applied entity values. For example, a rule command might be, "set this entity's maxlength value to equal 255" or "create a new entity from this one, set the new entity's type value to equal hook; and set the new entity's parent value to equal this entity's id value."

For rules intended to modify another entity's values, the rule typically includes a second set of "modify conditions" to find the second entity (or entities). For example, such secondary conditions might be, "if the second entity's id value equals this entity's parent value" or "if the second entity's type value ends with mod." Entities satisfying the secondary conditions are modified according to the rule commands.

Rules preferably do not contain loop commands such as foreach or while. Preferably loops are contained in the generator program.

Rules preferably do not contain strings of programming language or other technical language to be incorporated into the document. Preferably all technical language is stored in segments. Optionally, rules contain simple strings or numbers to be incorporated. For example, a rule may contain a value that assigns a default maximum string length of 255 to a database column.

Rules preferably do not reference other rules.

The "application" of a rule to an entity includes evaluating if the entity satisfies the rule conditions, including cases when conditions are not satisfied.

Rule commands said to be "modifying" an entity's values include adding new values, editing existing values, and deleting existing values. Optionally, a rule command adds a new attribute and value to the entity.

Optionally, rules are applied in the order they are listed. Optionally, the generator executes rules in stages. For example, in one embodiment the generator first applies a series of modifying rules, then a series of generating rules, then another series of modifying rules.

The domain ruleset is optionally embodied in general purpose code.

The domain ruleset is optionally embodied in a neural network.

Ruleset Syntax

Conventionally, template conditions for processing specifications are written in general purpose programming language or templating language that typically mirrors general purpose programming languages.

The present invention allows for a more focused, special-purpose ruleset syntax. This syntax has a number of advantages. First, a new architect need only learn this focused syntax, not a second GPL or quasi-GPL. Second, a generator program can run a ruleset developed by an untrusted third party without risking compromising the computer's security, as would be the case with general purpose code. Third, bug tracing, error checking, and general debugging is much easier in this syntax. The following section describes the preferred ruleset syntax.

Exemplary rules in the preferred embodiment:

```
////////////////////////////////
if type link
do mod self
set link_query blank
////////////////////////////////
if type link
if link_isback true
do mod self
set link_query ?back= [HERE]
////////////////////////////////
if type field
do mod link
modif link_field_id FIELD_ID
chain link_field_id ~
////////////////////////////////
if type link
if link_cont fwd
if link_field_id_2 true
do add entity
set obj LINK_OBJ_ID~OBJ_KEY
set segment web_load_fwd
set where LINK_ELEM_ID/load/elem/suc
set id LINK_ELEM_ID/fwd
set href
/LINK_PAGE_ID~PAGE_KEY/{LINK_FIELD_ID~FIELD_KEY}/
{LINK_FIELD_ID_2~FIELD_KEY}
set ord 99
```

A ruleset preferably comprises one or more files. Each file comprises multiple rules. Each rule in a file is separated by a divider string, preferably a series of forward slashes followed by a newline.

Each rule comprises conditions and commands, at least one condition and at least one command, each separated by a divider string, preferably a newline character.

Each line (either condition or command) is separated into three parts by a divider string, preferably a space character. The first part is the operator, the second part is the key, and the third part is the value. Excess divider characters and strings are considered part of the value.

For rule conditions, the operator starts with if, followed by a key comprising the name of an expected entity attribute, followed by a certain string value. This can be read as, "if the entity's key is equal to value, then proceed."

Multiple lines of conditions are joined with an AND operator, such that "if condition1 AND if condition2, then proceed."

Conditions optionally append certain characters to the end of the if operator to evaluate a non-equality operator. For example, the line ifstart key value is evaluated as, "if the entity's key starts with value, then proceed." Other operators include: ifin to match any part of the string, ifmatch to perform a Regular Expression match on the string, Mena to match the end of a string. For any conditional operator, the if can be replaced by ifnot (e.g. ifnotstart title Hello) to proceed if the condition evaluates false.

Each rule contains a command line starting with the do operator, called the "directive." This command informs the generator of what type of task the rule is to perform upon satisfying conditions. The possible keys of the do command are add and mod.

The add key signals that the rule commands will be to generate an additional entity. The value after add is the type of entity to generate. In this respect, do add blog is shorthand for do add/set type blog. Optionally, segment entities have a generic type=segity (or similar, where segity is shorthand for segment entity). Typically, these generic type segities are meant to represent one instance of one segment in one location.

The mod key signals that the rule commands will modify one or more existing entities.

The do mod command has a special self value that signals the only entity to be modified is the entity which satisfied the rule. The generator executes the rule commands upon the one satisfying entity, then iterates the entity loop.

Any other value following do mod is interpreted as a type and begins a new entity subloop looking for entities whose type attribute matches the type value (where type is a ubiquitous entity grouping attribute). The generator executes the rule's commands on all such entities with a matching type.

For cases where the architect wishes to modify only a subset of entities with a matching type, separate condition lines with the modif operator is used. The modif operator operates just as the if operator does, but its conditions are applied to the other entities in the subloop. For example, the line modifnotstart title Hello, matches any other entities whose title does not start with Hello. In this respect, the line do mod blog is shorthand for do mod and modif type blog.

Optionally, the ruleset optimizes the modify subloops in cases where attribute-values are known to be unique. For example, if the generator knows each entity's id value is unique, then modif id 100 is optimized to find the one entity with id=100 rather than iterate a full subloop.

The ruleset has a number of command operators to actually manipulate the satisfying entity's attribute values. set sets the attribute value to the given rule value, append appends the rule value to the end of the attribute value, prepend prepends the rule value to the beginning of the attribute value, del deletes the attribute and value, and so forth. Typically, the do add command is paired with set commands as every new entity attribute starts blank.

An important aspect of the ruleset is the ability to transfer values from the satisfying entity to the new/modified entity. This is done using a variable syntax. Preferably, satisfying entity values replace upper case strings of their attribute name in the rule values. For example, a satisfying entity has the attribute-value title=Hello and the satisfied rule has the command set title re: TITLE, then the other entity's value would be set as re: Hello. This allows rule-entity combinations to arrange segments whose arrangement is set by entity values, so both the rule architect and the entity constructor may rearrange segments.

The ruleset has a special command operator chain for related entities. Often two different entity types will have correlated attribute values. Often a rule satisfied by one entity wants to use values from the correlated entity. For example, a blog entity has a blog_id value that correlates to a post entity's post_blog_id value. The following chain command matches each post entity to its corresponding blog entity and pushes each blog value to the post entity.

```
////////////////////////////////////////
if type blog
do mod post
modif post_blog_id BLOG_ID
chain post_blog_id ~
```

The first line is a condition that satisfies for blog entities. Upon finding a blog entity, the second line instructs the generator to start a new entity subloop looking for post entities. The third line filters those post entities for those whose post_blog_id value corresponds to the blog entity's blog_id value (the capitalized BLOG_ID is replaced with the blog entity's blog_id value). Upon finding a match, the last line instructs the generator to push each blog attribute-value to the post entity. For example:

```
// These specifies
<blog blog_title="My Blog" blog_public="1" blog_id="1"/>
<post post_id="2" post_blog_id="1" post_title="First Post"/>
// are chained to become
<blog blog_title="Hello" blog_public="1" blog_id="1"/>
<post post_id="2" post_blog_id="1" post_title="First Post"
post_blog_id~blog_title="My Blog" post_blog_id~blog_public="1"/>
```

Preferably, the chain post_blog_id~line instructs the generator to prepend each attribute name from the blog with post_blog_id~. For example, if the blog entity's blog_title is My Blog, then the generator would push post_blog_id~blog_title=My Blog to the post entity. Prepending attribute names this way prevents naming conflicts when one entity is chained to two others of the same type. The tilde character is arbitrary, it is optionally any character not otherwise allowed in attribute names.

Chaining is how the present invention handles inheritance among entities.

Optionally, a rule contains a form command to transform an entity value. For example, form password md5 performs an md5 hash on the entity's password value. Transformations include converting to integer, floating point, lowercase, uppercase, hashing, striping characters, replacing characters, and similar.

Optionally a rule comprises a segment string such as set segment <a href="HREF">VALUE</a>. In this embodiment, instead of a rule identifying a separate segment string loaded separately, the segment is a designated string within the rule. The rule and segment are paired by hardcoding rather than referencing. This embodiment is not preferred as it reduces flexibility, creates redundancy, and mixes syntaxes for needless complication. Below is an example. In this embodiment, rules are contained in HTML comments and the paired segment string follows.

```
<!-----
if type obj
set id OBJ_ID
----->
<form action="obj_edit/ID">
CHILDPOINT
</form>
<!-----
if type field
if field_display true
``` set where FIELD_OBJ_ID
set order FIELD_ORDER
set id FIELD_ID
----->
<input type="FIELD_TYPE" placeholder="FIELD_PLACEHOLDER" />

Optionally, directive keys additionally contain modifiers to stage directive execution. For example, all rules with a do mod directive are executed, followed by a later stage of do mod 2 rules. The do mod 2 rules are executed in the same manner but at a different stage. Alternatively, rules have a designated stage command such as stage 1.

Optionally, this ruleset syntax is converted into general purpose code or other computer code for faster execution.

In an alternative embodiment, the ruleset is encoded in a typical programming language.

In an alternative embodiment, the ruleset is encoded in a templating language. This is not preferred as such languages are typically needless slow to execute and syntactically unsuited.

In an alternative embodiment, the ruleset is encoded in XML or XSLT.

Loop Optimization

The present invention iterates loops over the specification entities. Loops are typically initiated by foreach, for, while, or similar commands in a templating or programming language. This disclosure uses foreach loops in examples.

A conventional templating engine contains potentially unlimited entity loops as each template script may contain any number of entity loops and each document may call any number of template scripts.

Preferably, the present invention only contains two entity loops: one to apply rules to entities; and a second for rules with modify directives, applying the satisfied rule-entity combination to each entity another entity loop. The first entity loop is executed once per rule. The second loop is executed once per satisfied rule-entity combination where the rule has a modify directive. A simplified example:

```
<?php
    foreach ($rules as $rule) {
        foreach ($entities as $entity) {
            /* apply rule to entity */
            if ($rule_conditions_satisfied && $rule_directive=='mod') {
                foreach ($entities as $subentity) {
                    /* apply rule-entity to subentity */
                }
            }
        }
    }
?>
```

The present invention's inventive loop structure allows for certain rule-loop optimizations which may be otherwise impractical. The optimization of a loop is inversely related to the number of iterations it performs.

Other approaches may nest loops within templates, rules within loops, and templates within rules. For example, a template may contain a foreach loop, within that loop is an if condition, should the condition be satisfied then a child template is loaded and evaluated. This precludes analyzing rules as they are not listed in one location. Further, nesting conditional references to other templates makes predicting the sequence and number of rules applied impossible.

The present invention preferably separates loops, rules, and segments. The generator program preferably loads all rules at once, then runs a foreach loop across rules. Within the rule foreach loop, the generator runs another foreach loop across entities. Unoptimized, the generator program applies the conditions of each rule to each entity. Should the entity not satisfy the rule conditions, the generator iterates to the next entity. Should the entity satisfy the rule conditions, then the rule commands are executed.

Loading all rules at once allows the generator to easily analyze all rules and perform optimizations. For example, the generator receives a new ruleset. The generator identifies two rules that each contain two conditions. The first conditions of both rules are the same, "if the entity type equals animal, then proceed." The second conditions of both rules are similar, but differ for the value of X in, "if the entity animal type equals X, then proceed."

```
////////////////////////////////////
//
// RULE #1
if type animal
if animal_type unicorn
do mod self
set about I can fly.
////////////////////////////////////
//
// RULE #2
if type animal
if animal_type leprechaun
do mod self
set about I have a pot of gold.
```

The present invention optionally groups these rules, determining that an entity failing the first condition of the first rule will always fail the second rule. The generator reduces the number of rule-entity iterations each loop by not applying the second rule to all entity's failing the first condition of the first rule.

Optionally, the generator groups entities corresponding to rule groups. Should many rules have a condition filtering for an entity's type, then the present invention optionally groups entities by type, prior to application, only applying rules in a type group to entities in a type group. The present invention optionally further optimizes the entities by placing each entity (or a reference to it) into multiple groups according to other entity attributes. Grouping also reduces the number of iterations to perform.

Optionally, the generator deduces if/else rule relationships within a rule group. Any entity satisfying the first rule above must inherently not satisfy the second, so the generator skips the application of the second rule for that entity, reducing the number of iterations performed.

Ruleset optimization is preferably performed prior to loading a specification. The ruleset is preferably optimized to run less iterations in the rule-entity loop than the number of entities times the number of rules.

Alternatively, rules in the present invention are manually grouped and given if/else patterns. This method is not preferred as a computer typically optimizes the rules better than a human.

The present invention overcomes a version of the Halting Problem that affects other approaches. In computability theory, the Halting Problem is the problem of determining, from a description of an arbitrary computer program and an input, whether the program will finish running, or continue to run forever. In conventional templating engines, it is difficult or impossible to predetermine if the looped conditional template nesting will cause an infinite recursion loop for a given specification. For example, template A conditionally calls template B, template B conditionally calls template C, and template C conditionally calls back template A. The present invention overcomes this problem with a linear ruleset. An infinite segment loop is impossible as segments preferably do not call other segments. However, possibly, the ruleset of the present invention causes an infinite loop by generating an entity that satisfies a rule to generate another entity and so forth. Preferably, the present invention prevents this by analyzing the linear ruleset for such rules. Preferably, the present invention rejects any ruleset that would allow an infinite rule-entity loop.

The present invention optionally also optimizes its linear specification entities into groups by parent.

The present invention is not required to be optimized in in every aspect in every embodiment. Optionally, the present invention applies additional optimizations to the loops.

Segment Entities

Another aspect of the present invention is that given a specification and a domain, it can automatically generate additional entities from assumptions about how a document for that domain should form. This saves the constructor the tedium of manually specifying every aspect, while still giving the constructor fine control over the document.

The entities paired with segments are segment entities. Optionally, the generator generates an entity representing a link between two specification entities. Optionally, the domain ruleset always generates certain entities necessary for the domain.

An example rule in the domain ruleset might work as follows: (a) if the specity's type attribute equals field and its required attribute equals true, then create a new entity; (b) set the new entity's type attribute to equal required; (c) set the entity's field key attribute to equal the specity's key attribute value; (d) set the entity's id attribute to equal the specity's id attribute value, concatenated with the string req; (d) set the entity's parent attribute to equal the specity's parent attribute value. This example demonstrates some of the different ways a rule may transpose attribute values from a specification entity to a segment entity.

The domain ruleset is optionally applied during development of the specification, generating additional entities upon creation of a specification entity. This approach offers the same ease of development (the constructor does not have to manually create the segment entities in either), while offering the constructor the ability to modify the segment entities. For example, if a constructor creates afield entity that has a required=true attribute-value, then the domain ruleset may also generate an entity containing a text error message to display should an end user submit a request with that field blank to the generated program. By generating the segment entity immediately after the specification entity, and by storing the segment entity in the same form as the specification entity, the constructor has the ability to edit the text of the error message using the same tools (GUI or otherwise) used to create the field specification entity.

In previous disclosures, segment entities were variously termed "codems." The term is discontinued here. Once created, there is preferably minimal distinction between specification entities and segment entities, except for the entity values.

Optionally, the segment entities have certain common attributes and/or values. Optionally, a specity is modified to become a segity.

Segments

Segments contain sequences of characters (strings) to be incorporated into the generated document. Segments are preferably pre-written, stored in files, and treated as strings.

The generator loads a set of segments and modifies/arranges them according to the application of the domain ruleset to the specities.

Segment content reflects the type of document it is designed to generate. For example, segments in sets designed to generate computer programs will contain program instructions the desired programming languages. Segments in sets designed to generate English language documents will contain English words, phrases, and punctuation. Segments in sets designed to generate U.S. legal documents will contain words and phrases related to that body of law.

Segments are as long or as short as the architect wishes. A segment may be as short as a word or a number or a single program command. Or a segment may be thousands of words or program instructions long.

Optionally, a segment is blank. Optionally, a segment contains only a child insertion point. Optionally, a segment contains only a value insertion point. Optionally, a segment comprises numbers, binary, machine code, assembly code, integers, floating points, or other non-string values that are not evaluated as program instructions during generation.

Each segment is preferably associated with meta-data. A segment preferably has an identifier that is referenced by the entities in order to form entity-segment pairs. For one segment stored in one text file, the name of the file is preferably used to identify the segment. For segments stored in program variables, the name of the variable (or key of the array value) is preferably used to identify the segment. For segments stored in databases, an designated column preferably identifies the segment.

Optionally, one file holds multiple segments. Multi-segment files are preferably delineated by a divider string that the generator uses to split the file contents (e.g. PHP's str_split( ) function). Further, the delineation string preferably comprises multiple substrings or matches a Regular Expression pattern in order to associate meta-data or comments with a segment. For example, segments may be separated with HTML-comment-like strings that contain the segments identifier:

Preferably, the generator loads all segments at once.

Preferably, the generator does not evaluate any instructions or logic within the segments. Preferably, a segment does not reference any other segment or any ruleset rule. This reduces the complexity of architecting the present invention by removing the need for any distinct template scripting language.

Segments designed to generate a computer program optionally contain program instructions in multiple programming languages—for example PHP, HTML, and SQL in an exemplary PHP web application.

One segment optionally belongs to multiple sets.

Optionally, one or more segments from a set are not included in the generated document.

Preferably, entities are paired to instances of segments such that each segment is available for multiple pairings. It should not be assumed that each segment is limited to one pairing or one use in the generated program.

Arranging segments includes incorporating multiple instances of one segment as directed by the domain ruleset.

Preferably, one generator has access to multiple sets of segments. Optionally, the generator applies one specification with one ruleset to multiple segment sets to produce multiple documents.

A segment set is optionally designed for a desired programming language, a desired programming paradigm within a language, a desired layer (e.g. user interface or business logic) of a program, or a combination thereof.

Preferably, computer program segments contain flow controls for the generated program, including instructions such as if, else, for, while, and similar. Such segments optionally have their child insertion point placed within the conditionally-executed subroutine (or similar) so that child segments will be conditionally executed. The nesting of such segments allows the domain ruleset to impose a control structure that is not explicit in the specification.

In prior patent applications, "segments" were referred to variously as "templates" or "code templates" or "codelets" or "codesets" or "code snippets." The term "segment" and

```
<!-- php_blank_function -->
function ($PARAM) { /*CHILDPOINT*/ }
<!-- php_blank_function_2 -->
function ($PARAM, $PARAM2) { /*CHILDPOINT*/ }
<!-- web_form -->
<form method="post" enctype="application/x-www-form_urlencoded" id="VAR_HTMLID">
   <?php $act_key='VAR_CALL'; ?>
   <input type="hidden" name="_form" value="VAR_CALL" />
   <ol class="box form VAR_CLASS">
      <li class="top" onclick="return popClick(event,this)" hyper-mod="VAR_HYPERMOD">VAR_TITLE</li>
      <?php if (isset($forms[$act_key]['error_msg'])) { ?>
         <li
class="err"><?=htmlspecialchars($forms[$act_key] ['error_msg'])?></li>
      <?php } else if (isset($forms[$act_key]['success_msg'])) { ?>
         <li
class="suc"><?=htmlspecialchars($forms[$act_key] ['success_msg'])?></li>
      <?php } ?>
      CHILDPOINT
      <li class="bot">
         <input type="submit" id="VAR_CALL_submit" name="submit" value="VAR_SUBMIT" class="submit" />
         <?php if ($_SERVER['BACK']) { ?>
            <input type="submit" id="VAR_CALL_cancel" name="cancel" value="VAR_CANCEL" class="cancel"/>
         <?php } ?>
      </li>
   </ol>
</form>
``` derivatives are used here to include non-program document generation and to differentiate string-like templates in the present invention from template scripts, such as those of Velocity. Segment better encapsulates the string nature of this component of the present invention.

Entity-Segment Pairs

In the preferred embodiment, the generator pairs each of a plurality of segment entities with an instance of a segment.

Preferably, the two are paired by matching an entity value to a corresponding segment meta-data value. In the preferred embodiment, the entity's segment value is matched to the segment's identifier. For example, an entity with segment=action is paired with the segment stored in action.txt.

Preferably, each segment is paired with one entity that contains all values necessary to replace the segment's valpoints (see below) and the entity contains the information needed to arrange the segment relative to the other segments in the document. Arranging attributes are preferably id and parent for nesting, and order for sibling ordering.

Optionally, an entity is not paired with a segment.

Optionally, an entity is paired with a blank segment.

In an alternate embodiment, one segment is paired with multiple entities. Optionally these entities are related, for example, a grandparent, parent, and child entity.

Optionally, one segment is paired with one entity containing values to arrange the segment and one or more associated entities contain values to replace valpoints in the segment. Optionally the arranging entity has one or more values correlating to the valpoint entities.

In an alternate embodiment, one entity is paired with multiple segments. In this embodiment, each pairing of the entity should be counted as one entity and therefore each pairing a one-to-one entity-segment pair.

Value Insertion Points (Valpoints)

Preferably, some segments in a set contain value insertion points, or "valpoints" for short. Valpoints mark the locations where corresponding string values from the paired entity will be inserted into the segment string. Preferably valpoints are marked by distinctive strings correlating to the entity attributes. Using the segment example above, an all-capital PARAM valpoint would be replaced with the value of the entity attribute param.

The generator program preferably runs a loop on the entity attributes in order to replace all possible valpoints in the segment.

For computer program documents, valpoints are preferably differentiated from the typical underlying programming languages variables in such a way that a segment containing valpoints is still considered valid code of the underlying programming language. This allows segment architects to use all available programming language syntax parsing tools while developing segments.

Alternatively, for computer program documents, valpoints are formed as variables in the underlying programming language. In this embodiment, valpoints have their strings replaced prior to generation so the valpoint strings themselves are never executed as code.

Alternatively, valpoints are designated with special characters.

Alternatively, valpoints are designated by number.

Preferably, to reduce complexity, one valpoint is replaced with exactly one entity string value.

Preferably, to reduce complexity, valpoints do not contain any logic, any transformation instructions, or any other executable functions.

Alternatively, where an entity value is an array, the valpoint is replaced with the array values concatenated into a string. This is not preferred as it adds needless complexity. The preferred way of handling arrays is for the ruleset to process each array value into a distinct entity, pair that entity with a segment, and designate the pair as the child of the original entity.

Preferably, valpoint insertion is completed after pairing and prior to nesting. The entity-segment pair should not need to inherit any values from parent entities after pairing. The entity-segment pair should not need to know its location in the nested hierarchy in order to complete value insertion.

In one embodiment, a segment comprises multiple substrings. The generator optionally interprets the points between substrings as valpoints or childpoints. For example, a segment comprises a first half string and a second half string, and the generator interprets the point in between halves as the childpoint to insert child segment strings.

In prior patent applications, valpoints were termed "variablets."

Child Insertion Point (Childpoint)

Typically, some segments in a set will contain child insertion points, or "childpoints" for short. A childpoint marks the location the generator will insert child segment strings. Preferably, the childpoint is marked by a distinct string whose value is replaced for the arranged child strings using a generator program command such as PHP's str_replace( ). In the example above, the childpoint is marked by the string /*CHILDPOINT*/.

Optionally, segments allow multiple variations for the childpoint. In the example above, both /*CHILDPOINT*/ and simply CHILDPOINT mark the childpoint.

Preferably, a segment has one childpoint as this is the simplest embodiment.

Alternatively, a segment has multiple childpoints. Optionally, segments with multiple childpoints have a standardized placement of childpoints, such as each segment having a before, middle, and after childpoint. Optionally, the standardized childpoints have standardized names such as CHILDPOINT_BEF, CHILDPOINT_MID, CHILDPOINT_AFT. Optionally, the before and after childpoints are assumed to be at the beginning and end of the segment string, not requiring placeholder strings.

Segment Nesting

In the preferred embodiment, the generator recursively inserts the string content of each entity-segment pair into the string content of its designated parent segment at the parent's childpoint.

The entity in the entity-segment pair preferably contains an id attribute and a parent attribute. The "child" of a "parent" is identified by matching the child's parent attribute to the parent's id attribute. This process starts by generating segments for the lowest children, nesting them within their parents' segments, nesting those within their parents' segments, and so forth. This preferably ends with all relevant segments arranged into a continuous string serving as the generated document.

Optionally, the generator additionally orders sibling entity-segment pairs based on a designated entity attribute, for example an order attribute.

Optionally, an entity has multiple parents. Optionally an entity has one order value for each parent. Optionally the parent and order attributes each contain multiple values.

Generated Document

The present invention generates a document. The document comprises any desired sequence of characters (string).

The document optionally comprises multiple documents. The document is optionally saved to one or more files.

Desired parent entities are optionally given values designating them as separate files. File names are optionally fixed in the ruleset or are based on specification values.

The generated document is optionally outputted to a human interface.

The generated document optionally comprises a human language. Examples include manuals and support documentation. The generated human language document is optionally translated into another human language.

The generated document is optionally a legal document. Examples include contracts, articles of incorporation, terms of service, and patent applications.

The generated document is optionally a medical document, for example, a diagnosis.

The generated document is optionally an engineering document. Examples include construction plans and environmental impact reports.

The generated document is optionally a scientific document. Example scientific fields include biology, chemistry, physics, and environmental sciences.

The generated document is optionally a computer program.

The generated document is optionally a computer program that is executed upon generation.

The generated document is optionally a computer program comprising multiple programs, executed separately or at once, on one or more computing devices.

The generated document is optionally a computer program that is sent to a different computing device for execution, at present or in the future.

The generated document is optionally a computer program that is to be executed on the same computing device as the generator, at present or in the future.

The generate document is optionally a computer program comprising assembly language, object code, machine code, or other code.

The generated document is optionally a computer program that is additionally compiled into another programming language, assembly language, object code, machine code, or other code.

The generated document is optionally computer-readable documentation describing another generated document. Examples include API specifications and other standardized specifications.

The generated document is optionally an iOS application, Android application, Windows application, other desktop application, other mobile phone application, or other operating-system-specific application.

The generated document is optionally an API computer program performing CRUD functions on a persistent data store such as a database.

The generated document is optionally the front-end, back-end, or both ends of a website application.

Generated documents are optionally additionally formatted according to the language and domain. For example, in manual PHP programming, it is considered best practice (but not required for computation) to start a newline and indent one level deeper after an open curly bracket character ("{") for readability. In this case, the present invention optionally runs a generated PHP program through a PHP formatter to format the code for readability.

The generated document is optionally an HTML, XML, XSL, Markdown, Adobe PDF, or Microsoft Word document.

Generated Human Language Document

The present invention optionally generates a document in a human language such as English. The generated document is optionally a legal document. The generated document is optionally a U.S. legal document concerning federal, state, and/or local law.

Human language documents typically have minimal program instructions. Formatting instructions should be considered "program instructions" in generated documents. These program instructions include formatting for HTML, XML, Markdown, Adobe PDF, Microsoft Word, and all markup languages.

Human language documents typically comprise titles, section headers, and instructions for arranging paragraphs. Paragraphs or sections are optionally numbered.

In one embodiment, the generated document is a partnership agreement, operating agreement, articles of incorporation, shareholder agreement, investor agreement, joint venture agreement, or other document relating to a business entity such as a corporation, LLC, or LP. In another embodiment, the generated document is a lease agreement, purchase agreement, mortgage agreement, deed, lien, licensing agreement, or other document relating to property ownership. In another embodiment, the generated document is a premarital agreement, divorce agreement, custody agreement, power of attorney, will, or other document relating to estates or families. In another embodiment, the generated document is a non-disclosure agreement, non-compete agreement, employment agreement, contractor agreement, or other document relating to employment. In another embodiment, the generated document is a terms of service (TOS), privacy policy, or other document related to commercial services.

Exemplary Legal English terms include: agreement, termination, heir, power of attorney, bankruptcy, partner, property, asset, liability, disclosure, plurality, at least, one or more, no more than, no less than, and party. Additional Legal English terms include the names of laws and court cases.

WYSIWYG Editor

In one embodiment of the present invention, the constructor manipulates specifies using a What-You-See-Is-What-You-Get (WYSIWYG) editor. A WYSIWYG editor displays the formed document and allows the constructor to use a GUI to manipulate the specification entities that generated the document. Optionally, a WYSIWYG editor displays an approximate representation of the formed document during editing. Optionally, the WYSIWYG editor updates the display only periodically or upon constructor instruction to do so; this is especially used in embodiments where regenerating the document takes a non-negligible amount of time.

In one embodiment, the present invention generates an HTML document. In a related alternate embodiment, the present invention generates a program (e.g. PHP or Python) that outputs an HTML webpage. In both embodiments, the generator program associates an HTML element in the generated document with the specification entities that generated that element. Clicking on an HTML element (or similar) activates an editor interface where the constructor manipulates the associated specifies. In this embodiment, the HTML page itself serves as a part of the WYSIWYG editor system.

Preferably, the editor program is a separate website and activating the editor comprises opening the editor website in the constructor's browser. Alternatively, the editor program is a JavaScript modal window in the HTML document. Alternatively, the editor program is built into the constructor's browser, either natively or through a browser plugin.

Optionally, activating the editor involves a secondary action such as alt-clicking, shift-clicking, double-clicking, or control-clicking. Optionally, the constructor's browser sends a designated web cookie, a designated request header, a designated POST field, a designated query string, or otherwise signals to the HTML document to enable the editor. Optionally, the constructor uses a specialized browser or browser plugin to enable the editor. Optionally, the HTML document (or related documents) comprise JavaScript to enable the editor.

Preferably, the HTML element contains a designated attribute identifying the associated specity in the editor program. The element itself, such as the HTML tag name, optionally provides information used for activating the editor. For example:

```
<img src="/logo.png" id="logo" hyper-id="1234"
onclick="if (event.altKey) return
hyperpilerEdit(this)" />
```

Optionally, the HTML element contains a designated attribute linking to a webpage to manipulate the associated specities. For example:

```
<img src="/logo.png" id="logo" hyper-edit=
"http://hyperpiler.com/img_edit/1234"
onclick="if (event.altKey) document.location.href=
this.getAttribute('hyper-edit')"
/>
```

Optionally, the HTML element is wrapped in another element for editing purposes. For example:

```
<span class="hyperpilerEditor" hyper-edit=
"http://hyperpiler.com/imp_edit/1234"
onclick="if (event.altKey) document.location.href=
this.getAttribute('hyper-edit')">
   <imp src="/logo.png" id="logo" />
</span>
```

Alternatively, the HTML document is in another markup language, such as Markdown. Alternatively, the HTML document is a Word, PDF, or similar display document with hyperlinking (or hyperlinking-like) capabilities.

Specification entities for a human language document are optionally edited in a WYSIWYG editor program. The editor program displays the document. Clicking on a section of the document directs the constructor to edit the entity (or entities) associated with that section. Optionally, the constructor adds text directly to the document by selecting a location and entering the desired text. In one embodiment, the WYSIWYG editor creates an entity designated for custom text, storing the text and the location to place the text.

In embodiments generating executable computer programs, the generator optionally includes code comments associating portions of code with specities. In one embodiment, the generator places code comments comprising URLs linking to webpages to manipulate the species associated with nearby code portions. Optionally, the code is displayed in an editor program that identifies these comments. Optionally, the editor program makes these comments or code portions clickable to initiate specity editing. Optionally, the editor program is a web browser. Optionally, the editor program is an IDE.

Implementation as a Framework

The present invention is alternatively implemented as a framework program. Here a "framework program" describes a program containing a prewritten body of code combined with variable settings to alter the conditional execution of that code. In this implementation, the specities, the domain ruleset, and the segments are all contained within the code of the framework program, encoded in the framework program's given programming language.

The specities are encoded as variables within the framework program.

The domain ruleset is encoded into the control structure of the framework program.

The segments are encoded as subroutines and/or instructions contained within conditional expressions of the framework program.

The hyperpiling occurs upon conventional compiling (or interpreting) of the framework program.

In this embodiment, the conventional compiler converts the framework program using the specity variables to selectively arrange and execute the code of the desired segment subroutines, while selectively ignoring the undesired segment subroutines. Whereas the preferred embodiment takes limited specification entities and adds functionality, the framework program has unlimited possible combinations of functionality and selectively limits the final functionality according to the specification entities upon compiling. The code framework implementation is currently less preferred as computer execution of the resulting code is typically slower than that of the preferred embodiment, however this may change with advances in the pertinent arts.

Computer Program Document Compiling

Another aspect of the present invention is a computer method and device that processes a domain-specific language into a general purpose programming language.

Another aspect of the present invention is a computer method and device that processes a flow-uncontrolled computer program into a flow-controlled computer program.

Conventionally, a programmer will create a computer program by manually typing instructions encoded in a given programming language's syntax. Typically, the programmer will use a general purpose language (GPL) in which the developer specifies a control structure describing a series of computations to be conditionally executed. Common control structure statements in many programming languages include: if, else, for, and while. These statements control how instructions are sequenced over time, thus make the programming language "controlled." A programming language must have some control structures in order to be "Turing complete" or "computationally universal."

Conventionally, once a developer has finalized his GPL program, he inputs it into a compiler which converts the human-readable code into computer-executable code. Alternatively, the developer may write code in a GPL scripting language which is compiled by a special-case compiler called an "interpreter" that compiles the program at the time of execution. Compilers typically perform adjustments to optimize the input code, but do not alter or add functionality to the output code. Compilers typically perform a one-to-one functional translation of controlled input code to controlled output code.

Conventionally, a developer will use a modeling language to describe conceptual entities in a given conceptual framework. For example, a developer will use Hypertext Markup Language (HTML) to describe the layout of elements on a webpage. Here we can consider markup languages as special-case modeling languages. Modeling languages are intrinsically not suited for general programming purposes. Modeling languages typically lack control structures and are Turing incomplete, thus they are "uncontrolled." Because of this, modeling languages are typically not compiled to GPLs.

The downside of modeling languages is that they are less capable than general purpose languages, but their upside is that their simple syntax makes them much easier for humans to learn and write.

Developers have long sought a method for developing GPL computer programs via graphical user interface (GUI) or simplified syntax, but previous attempts have proven impractical. The impracticality has arisen from the trade-off between capability of the code and the complexity of development. Previous methods would be highly capable, but so difficult to develop that manual coding proved more practical. Or, previous methods would be simple to develop, but so limited in their capabilities that they were relegated to niche tasks.

In one embodiment of the present invention, the specification entities are encoded in an uncontrolled domain-specific language. This allows for easy manipulation of specities, both manually and through GUI tools.

In one embodiment of the present invention, the generated document is a controlled computer program encoded in a general purpose language.

The present invention offers improved methods to offer both greater capability and reduced complexity. By automatically generating additional entities, particularly during development so the constructor may manipulate them, the present invention allows a high degree of customization without requiring the tedium of having the constructor manually create every entity.

The present invention differs from a conventional compiler in a number of ways.

A conventional compiler faithfully converts a set of computing tasks from one programming language to another, performing as close to a one-to-one functionality conversion a possible. Accordingly, a conventional complier does not add functionality to the generated program. Nor does a conventional compiler inject control structures in the output program that did not exist in the input program.

Conversely, the present invention preferably performs a one-to-many conversion, converting one specity into multiple distinct program instruction segments in the generated program. This distinction allows the present invention to add functionality and control structures to the generated program that were not explicitly described by the specification entities. The generated program code does not need to linearly correspond to the specification entities. Two independent specities in the specification entities optionally mutually modify each other's code segments in the generated program, or they optionally generate a plurality of code segments in the generated program.

The extra abilities of the present invention come at the cost of flexibility. Because functionality and control is typically not explicit in the specification entities, the present invention must derive these from one of a limited number of domain rulesets, each containing a limited number of rules. The limited domain rulesets and rules within each mean the present invention's use for general purpose compiling is limited.

The present invention generates computer program documents agnostic of the document programming language or programming paradigm. Documents may be generated in any programming language. Documents may be generated using the Object Oriented Programming (OOP) paradigm or procedural paradigm.

Low-Code Architecture

Another aspect of the present invention is low-code programming.

The emerging field of "low-code" or "no-code" software development seeks to alleviate the programmer bottleneck by simplifying the process of computer programming, allowing a broader group of workers to construct computer programs. However, at present low-code solutions have failed to displace any significant amount of manual coding.

Current low-code solutions are trapped in a trade-off between simplicity and capability. Solutions allowing for simple program construction lack the capability to perform complex or customized tasks. Solutions allowing for complex programs are too complicated and tedious to construct practically.

This trade-off has not been satisfactorily resolved because low-code solutions are seen as a continuation of manual coding. Advances in programming have heretofore focused on improving the procedure of writing program code, such as new application-specific languages like PHP for web development or code frameworks that implement common tasks with fewer lines of manual code like jQuery. By extension, low-code solutions are typically seen as faster or easier procedures for writing program code, allowing a lay person to form computer instructions without knowing a complicated syntax of semi-colons, parentheses, periods, and curly brackets.

While current low-code solutions solve this procedural burden of programming, they fail to solve the architectural burden of programming. The purpose of complicated programming syntaxes is to formalize the program's architecture. Architecture describes how the many subroutines of a computer program interact in order to execute the desired task. A given program may have thousands of subroutines, each needing to be executed in the correct sequence upon the correct conditions. The burden of conceptualizing the exponential number of relationships between subroutines in a computer program is a much greater burden than the procedural burden of writing code syntax.

Conventional low-code solutions dealing with architecture are limited in their capabilities. Typically, such solutions are cloud-based and do not generate documents. Typically, such solutions have very narrow capabilities and cannot be customized to the degree to which the present invention allows.

The present invention introduces this innovation: the primary utility of low-code constructors is not in forming the code syntax within the subroutines, but rather in architecting the subroutines themselves. The present invention architects formed programs through a combination of the ruleset arranging segments and program instructions controlling the program flow in the segments.

SLAD Architecture

Architecting an API program presents developers with two conceptual trade-offs.

The first trade-off is simplicity vs speed. The benefit of a web service API is that it allows third party developers to interact with the server in a simple, secure manner. The downside is that the network overhead of such an API call makes it significantly slower than running the same code internally in the program. A programmer may develop only an API program, slowly but simply running all manipulations through the API. Or, a programmer may develop an API plus an avenue for the program to execute those same manipulations internally. While the former one-avenue architecture may be quicker and easier to develop; upon scaling, such programs are forced into the more efficient two-avenue architecture.

The second trade-off of is redundancy vs. complexity. Upon accepting the two-avenue architecture, the developer must choose between maintaining these avenues as two semi-redundant codebases or as one more complicated codebase with two access methods. Both of these choices introduce new error vectors. Two semi-redundant codebases increase the likelihood of errors by requiring double updates and double testing. One codebase with two access methods increases the likelihood of errors by hiding them under the greater complexity.

The redundancy vs. complexity trade-off has remained largely unresolved in manual programming. In low-code programming, the trade-off is largely moot as construction engines are rarely used to develop such sophisticated programs. The present invention offers a novel resolution for this trade-off that is uniquely suited for low-code generators.

The preferred solution for the API architecture trade-offs is called a Storage-Logic-Access-Display (SLAD) architecture. SLAD applies to both manual and low-code programming, but offers major advantages when applied to low-code generators using the present invention.

Each word in SLAD represents a subroutine in the stack order.

The storage layer handles reading and writing of a data object. This is typically managed through a separate storage engine program, such as a database, that interfaces with the API program. The preferred storage layer is a relational database, such as MySQL, PostgreSQL, or Oracle Database. Alternatively, the storage layer may be a key-value store such as Redis, Riak, AWS Dynamo, or Memcached. Alternatively, the storage engine may be a document store such as CouchDB, Elasticsearch, or MongoDB. Alternatively, the storage engine may simply be a subroutine in the API program that reads/writes files. Some embodiments may use a combination of storage engines, particularly when caching. Preferably, there is a single storage abstraction to which all storage requests are sent.

The logic layer handles the business logic of manipulating the object before passing the data to the storage layer. Upon success, the logic subroutine calls the storage subroutine to read/write data. Upon failure, the logic subroutine returns an error. Example manipulations include creating a new object, reading one or more existing objects, updating an existing object, deleting an existing object, and duplicating an existing object. Example business logic rules might be that a certain field cannot be empty, or a field must contain only 0-9 digits, or the value of one field must match the value of another. The rules and manipulations of this logic a highly dependent on the intended uses of the program. Preferably, each object-manipulation has a single subroutine through which all such actions occur so that the same rules are consistently applied to all objects of that type. In the preferred embodiment, logic subroutines are placed into functions named as layer_object_manipulation( ). For example a logic function for updating a widget object would be named lgc_widget_update( ).

The access layer receives input from a user, authorizes it, passes the input to the relevant logic function, and returns the result in the appropriate format. SLAD is intended to have multiple parallel access avenues. Example access layers are the API and the Command Line Interface (CLI). One type of user may want to execute igc_widget_update( ) from the CLI, another from the API. While the business logic is the same for both CLI and API, the authorizations and format of returned data will be different, necessitating two parallel access avenues. Preferably, access functions follow the same naming convention as logic functions, but proceeded by three-letter abbreviation of the avenue, such as cli_widget_update( ) and api_widget_update( ). Should the program offer two API avenues, the second could be named api2 and its access function could be api2_widget_update( ).

The display passes data to and from the access layer, displaying it in a human readable format. SLAD is intended to have multiple parallel display layers such as website HTML, iOS app, and Android app.

API

A typical computer program document generated by the present invention is an Application Programming Interface (API). The purpose of an API is to allow one program to pass input and output data to another program in a prescribed manner. Typically, an API program runs on a server computing device and processes network requests from client computing devices.

Discrete tasks made available by the API are called endpoints. Typically, one endpoint will primarily perform one action upon one row in one database table. Common actions are to create, read, update, and delete (CRUD).

Often requests contain an API key or a session token used to identify the user making the request.

In preferred embodiments, the API is a web service that wraps request and responses in HyperText Transfer Protocol (HTTP) or HyperText Transfer Protocol Secure (HTTPS) and encodes response data in XML or JSON.

Alternatively, the API request/response is wrapped in any application layer protocol. Examples include HTTP, HTTPS, FTP, SFTP, POP, SMTP, Telnet, XMPP, ONC, RPC, AMQP, DDS, STOMP, and SSH.

Alternatively, the API request/response is transported with any transport layer protocol. Examples include TCP and UDP.

Alternatively, the API request/response uses custom protocols or a combination of standard and custom protocols.

Alternatively, the API request/response uses local pipes or sockets.

Alternatively, the API request/response is intermediated by a middleware program. Examples include ZeroMQ, RabbitMQ, IBM MQ, and AWS SES.

Alternatively, the API response data is encoded in any structured data format.

Alternatively, the API uses a prescribed system such as Representational State Transfer (REST) or GraphQL.

Databases

The following are SQL specifications for tables that are referenced by example in this disclosure. In these examples, column names start with the name of the table, followed by an underscore, followed by a descriptor. In this embodiment, should the descriptor be in the form something_id, the column value is assumed to be linked to the something_id column in the something table. In alternate embodiments, columns may have explicit values linking to other columns.

An example blog table specification. This SQL specification contains an entity representing the table, including a value for the table name. This specification also includes an entity for each column containing a name value and a datatype value.

```
CREATE TABLE blog (
    blog_id BIGINT,
```

```
user_id BIGINT,
blog_title VARCHAR(255),
);
```

An example post table specification. This table is the child of the blog table due to the post_blog_id column which holds a blog_id from the blog table.

```
CREATE TABLE post (
post_id BIGINT,
post_blog_id BIGINT,
post_title VARCHAR(255),
post_likes BIGINT,
post_text LONGTEXT
);
```

An example like table specification to record when a user "likes" a post. This table is the child of the post table due to the like_post_id column which holds a post_id from the post table. This table is also the grandchild of the blog table due to the like_blog_id column which holds a blog_id from the post table. In a separate family tree, this table is the child of the user table due to the like_user_id column which holds a user_id from the user table.

```
CREATE TABLE like (
like_blog_id BIGINT,
like_post_id BIGINT,
like_user_id BIGINT,
);
```

In the preferred embodiment, a database row's unique identifier comprises an auto incrementing integer. Alternatively, a row's unique identifier comprises a random integer. Alternatively, a row's unique identifier comprises a random string. Alternatively, a row's unique identifier comprises a user-inputted value, checked for uniqueness against other user-inputted values. Alternatively, a row's unique identifier is a combination of columns.

In the preferred embodiment, a database column's unique identifier is its name. Alternatively, a column's unique identifier is its order. Optionally, a column's unique identifier is associated with a program variable.

In the preferred embodiment, a database table's unique identifier is its name. Optionally, a table's unique identifier is associated with a program variable.

Optionally, the unique identifiers of tables, rows, and columns are transformed into distinct, but still uniquely identifying values at various points in the program. For example, a table named blog may at some point be identified as table1. In such a case, table1 should be considered a unique identifier for the table.

Database columns, API input fields, and other values herein that are said to be "correlated" are preferably equal. The term "correlated" is used as there are some embodiments in which the two values differ, but one value can be computationally converted to the other.

This disclosure primarily uses relational database terms is for clarity and consistency. This should not be construed to limit the invention to relational databases. The methods described herein are intended for use in other computer data storage systems as well. References to relational databases and related terms are alternatively substituted for non-relational databases, graph databases, document stores, key-value stores, entity-attribute-value stores, time series databases, CSV files, JSON files, or other computer-readable structured data storage system and that system's corresponding terms.

In one embodiment, the present invention is applied to an entity-attribute-value-like storage system. In this embodiment, a row is substituted with an entity, a column is substituted with an attribute, and a table is substituted with a type of entity. Typically, entities have designated unique identifiers that serve as the equivalent of a column storing a unique identifier.

Business Logic

Computer programs performing CRUD operations typically contain subroutines called business logic that encode the real-world business rules that determine how data can be created, stored, and changed. For example, a program may require that a certain column must be 2 characters long or that the column contain only numbers. Should a user attempt to create a new row that violates the business logic rules, the program typically returns an error message.

Constructing a business logic subroutine in a conventional low code generator is tedious. A constructor typically must:
(a) Create a database table
(b) Create a plurality of columns
(c) Create a subroutine
(d) Link the correct input variables into the subroutine
(e) Link each input variable to a database column
(f) Apply the desired rule functions to each variable
This process becomes increasingly complex as the number of database columns increases.

The present invention offers a much simpler solution. The constructor must merely creates a database table with the desired columns (steps a and b above) and the generator will derive all of the program instructions and automatically link all variables and columns and functions correctly.

By using code segments, the present invention removes the complexity of sequencing program instructions. And the present invention removes the complexity of linking variables by consistently using values from the specification.

Typically, business logic subroutines specifically need the table and column identifiers to function.

Child-Parent API Authorization

When a user requests to act upon a given row through a program's API, the typical and straightforward method of authorization is to lookup the user's granted permissions for that row in a permission database based on a combination of the user's unique identifier ("UID") and the row's unique identifier ("CRID").

However, in many cases, an API program may benefit from storing permissions based on the UID and the ID of a distinct, related row. In this case, the row being acted upon is termed the "child row" in the "child table" and the related row is termed the "parent row" in the "parent table." The distinction of parent and child is merely relative between the two tables. The parent table/row exists independently from any child table/row. While the child table/row contains a column holding the value of a parent row identifier ("PRID"), thus making the child table/row dependent on the parent table/row. The parent-to-child relationship is one-to-many.

Storing permissions by PRID has practical benefits. It reduces the number of permissions needed to be stored, storing one parent permission per user rather than many child permissions per user. This makes caching permissions more efficient as there are fewer permissions, each accessed more frequently. And a user added to the parent's permissions is automatically granted those permissions on all children, rather than having to be granted permissions on each child individually.

For example, a program allowing users to edit a post on a blogging platform may benefit from storing permissions based on the blog_id, not the post_id. In this case the blog table/row is the parent and the post table/row is the child.

However, in both manual coding and low-code construction, this authorization scheme is architecturally complicated and prone to errors. Using typical methods, the conceptual steps of architecting such a subroutine on a low-code generator are:
  (a) Create parent table.
  (b) Create a parent identifier column.
  (c) Create a parent-user permission table.
  (d) Create a child table.
  (e) Create a parent identifier column.
  (f) Create a column holding a parent identifier in the child table.
  (g) Create an API subroutine.
  (h) Add statements looking up a child row based on the API input.
  (i) Add statements selecting the parent identifier value from the identifier child row.
  (j) Add statements looking up the row in the permission table associated with the CRID and UID.
  (k) Add statements to check user's permissions against the API request.

The most difficult steps of the process are in the latter half where the program must perform a sequence of tasks upon interchanging variables. Even using a low-code constructor to remove syntax burdens, correctly connecting the proper variables to the proper functions is difficult.

The present invention greatly simplifies the latter half of this process. In one embodiment of the present invention, the equivalent steps are:
  (a) Create a parent table.
  (b) Create a parent identifier column.
  (d) Create a child table.
  (e) Create a child identifier column
  (f) Create a column in the child table to hold a parent identifier
  (g) Create a subroutine designated to authorize an API request acting on the child table.

From there, the generator deduces that the child's links to the parent, linking that to the presumed permission table and presumed UID, automatically adding the lookup and permission statements in the API subroutine.

Grandparent Fill

There are many times in which a constructor may want to fill a child row with values from a parent row, and values from that parent's parent (grandparent) row. In doing so, it is essential that the grandparent values correspond to the correct parent values for the integrity and security of the data. However, in both manual programming and conventional low-code construction, linking the chain of column values to accomplish this can be difficult.

The present invention solves this problem using prewritten code segments auto-filled with the relevant column names. This removes any human errors that could occur when constructing or typing such a subroutine.

In the preferred embodiment, status as a grandparent table, parent table, or child table is deduced from the column relations. A table with independent columns is a grandparent. A table with a first-order dependent column is a parent. A table with a second-order dependent column is a child.

Table generations are relative—a given table may be a child to another table, a grandchild to another, and a parent to another.

Alternatively, designated specification values assign the child, parent, or grandparent table.

Hooks

Complex programs often require that upon acting on a given row, related actions must also be performed on additional rows. The link chaining one subroutine to another in a program is called a hook. For example, if a user were to click "like" on a blog post, the program may create a new row in the like table, followed by a hook to increment up the post likes column in the post table.

Typically, the hook entity in the specification requires an identifier for the first subroutine and an identifier for the second subroutine.

Alternatively, the hook entity may be embedded within the first subroutine entity, implicitly identifying the parent entity as the first subroutine.

Preferably, subroutines are embodied as functions.

Preferably, the hook snippet is embodied as a function call, calling the second subroutine. The hook may pass one or more variables to the second subroutine.

API Format

A common task for a client program is to request to read a given row in a given database table from the API server program. Outputting one row from one database table is a fairly simple task, allowing the output data to be structured in any number of ways.

Typically, API output data is formed as an array in the program and then encoded as a string for output. Common encodings include JSON and XML.

Typically, an API array is formed with meta data at the top level, with an array holding the returned row data in a deeper level.

The process becomes more complex when the client program needs a requested row and a plurality of related rows. For example, a client program wishes to display the post title and the blog_title related to every like associated with a given like_user_id.

The simplest solution is for the client to make multiple API calls, one call per table. The problem is each request incurs overhead, making a multi-API-call program slower than a single-API-call one.

Another solution is to simply merge the like row with the related blog row with the related post row. This can be done in SQL with a JOIN statement or this can be done in the program by merging the row arrays. This solution has two main drawbacks. First, it requires all related rows to be stored in one table on one server—this limits the horizontal scalability of the database. Second, it can be highly redundant—if the user liked 100 posts on one blog, then the API will output the same blog row 100 times—this needlessly slows the program.

The present invention offers a more efficient solution by grouping each table's rows into their own array. This returns all required data in an easily relatable format, while only sending each row's data once. The requested rows are given values pointing to identifiers of related rows from other tables. Related rows need only be outputted once.

An example API output in JSON:

```
{
  "success": true,
  "data": {
```

```
     "like": [{
       "like_id": 300,
       "like_blog_id": 100,
       "like_post_id": 200,
       "like_blog_id@blog": 0,
       "like_post_id@post": 0
     }, {
       "like_id": 301,
       "like_blog_id": 100,
       "like_post_id": 201,
       "like_blog_id@blog": 0,
       "like_post_id@post": 1
     }, {
       "like_id": 302,
       "like_blog_id": 100,
       "like_post_id": 202,
       "like_blog_id@blog": 0,
       "like_post_id@post": 2
     }],
     "post": [{
       "post_id": 200,
       "post_title": "My first post"
     }, {
       "post_id": 201,
       "post_title": "Another post"
     }, {
       "post_id": 202,
       "post_title": "I quit blogging"
     }],
     "blog": [{
       "blog_id": 100,
       "blog_title": "My Blog"
     }]
   },
   "perm": {
     "like": [{
       "like_admin": 1
     },
     {
       "like_admin": 1
     },
     {
       "like_admin": 1
     }
     ],
     "post": [{
       "post_admin": 1
     },
     {
       "post_admin": 0,
       "post_editor": 1,
       "post_viewer": 1
     },
     {
       "post_admin": 0,
       "post_editor": 0,
       "post_viewer": 1
     }
     ],
     "blog": [{
       "blog_admin": 0,
       "blog_edit": 1
     }]
   }
 }
```

In this example, the like row keys containing an @ identify related rows in the form column@table2=order, where table2 is the related table and order is the order (starting at zero) of the related row within that table's array in the API data. The @ character is arbitrary and could be any character (or string) not allowed in the column names.

Combining entities in the API with an at-sign is similar to chaining entities in the ruleset using a tilde. The two stages purposefully use different divider characters so that API dividers aren't misinterpreted as chaining dividers during generation.

Each like row can be correlated on the client side to its related rows using the related row's unique identifier. Note that every like row relates to the same blog row, but the blog row is only transferred once.

A requested row typically needs three pieces of information to identify a related row: a table identifier, a related row identifier attribute, and a related row identifier value. Depending on the embodiment, some of this information may be explicit or implicit.

Preferably, the table is identified by its name and points to the corresponding key name in the data array. The table name may be implicit in on or more of the requested row's column names, assuming consistent column naming using related table names such as table1_table2_descriptor. Alternatively, the requested row points to the table's order in the data array.

Preferably, the related row identifier attribute is the order of the related row in its table's array. Alternatively, the related row identifier attribute is the related column name. The related column row name may also be implicit in one or more requested row column names, assuming consistent column naming such as table1_table2_descriptor.

The related row identifier value corresponds to the related row identifier attribute: order for order, column value for column name, etc.

The API optionally contains another array containing permission data for each returned row. The permission array mirrors the data array such that permissions for each row have a similar index to the row data itself. In the example above, the like accessed in PHP as $api['data']['like'][0] has permissions stored at $api['perm']['like'][0]. The client application optionally uses this permission data to show/hide display elements.

Arrays in the API are optionally associative or enumerated.

This API output structure is useful in all forms of program development, but it is particularly useful when used in programs generated with the present invention. The generator automatically incorporates code snippets to include the related rows in the API output. Further, the generator optionally incorporates code snippets into the API's corresponding user interface program to display such related rows as the constructor desires.

Example

The following example illustrates one embodiment of the present invention.

Two specities, embodied in an HTML-like syntax, are loaded into the generator:

```
<object name="employee" title="Employee" id="1">
<field name="firstname" title="First Name" id="2"
  parent="1" type="text">
```

The generator loads a domain ruleset designed to output a database-driven website.

The generator loads a set of segments containing PHP, HTML, and SQL code.

The domain ruleset is applied to the two specities to generate several additional entities. Certain entities are generated by default by the ruleset. For illustration, the geneties herein are expressed in an HTML-like syntax. For illustration, attribute values carried over from the specities are bolded.

By default, the domain ruleset generates a segity to create a file to hold SQL commands to form the relevant databases:
<segity type="file_sql" filename="create.sql" id="100">

From the <object> specity, the domain ruleset generates a segity to create a database table. Note the "name" attribute is transposed from the specity to the segity.
<segity type="sql_table_add" name="employee" id="101" parent="100">

From the <field> specity, the domain ruleset generates a segity to add a column within that database table. Note the parent value of the segity equals the id value of the previous segity to signify to which table this column belongs. Here the type value from the specity is translated into the appropriate corresponding SQL type.
<segity type="sql_row_add" name="firstname" type="varchar(255)" id="102" parent="101">

From the <object> specity, the domain ruleset generates a segity to create PHP file for adding a new row to that table. That file contains two sections, one section for executable PHP and one to display HTML code. Note the domain ruleset automatically gives the executable section an order of 1 and the display section an order of 2. Note the domain ruleset chose the filename attribute by using the <object>'s name and then appending_add.php.

```
<segity type="file_php" filename="employee_add.php" id="200">
<segity type="php_exec" id="201" parent="200" order="1">
<segity type="html" id="202" parent="200" order="2">
```

From the <object> specity, the domain ruleset generates a segity for saving the inputted value as a new row in the database. This segity's parent value is the PHP executable section of employee_add.php where it will be located.
<segity type="php_row_add" table="employee" id="300" parent="201">

From the <field> specity, the domain ruleset generates a segity to accept the firstname field as column in the new database row:
<segity type="php_col_input" table="employee" column="firstname" id="400" parent="300">

From the <object> specity, the domain ruleset generates a segity for the HTML form that will be submitted:

```
<segity type="html_form" title="Add Employee"
   action="employee_add.php"
   parent="202" id="500">
```

Since the <field> object is loaded in an HTML-like format with HTML-like attributes for an HTML specification entity, it is converted into a similar segity:
<segity type="html_input" type="text" name="firstname" id="600" parent="500">

The specities and segities now comprise:

Each segity type now corresponds to a segment. Each segity is paired with a copy of its corresponding segment. The valpoints in each segment are replaced with the corresponding attribute values from its paired segity. The resulting code segments are nested according to the segities parent value and then ordered according to their order value.

The following describes this process for the first three segities listed—segity100, segity101, and segity101—used for SQL database creation.

The segment for segity100 is file_sql, this segment simply contains a child insertion point. The purpose of this segment type is to signify that this segity should be outputted as its own file called create.sql in the generated program. The segment contents initially reads:
CHILDPOINT The segment for segity101 is sql_table_add, which contains SQL code:
create table 'NAME' (CHILDPOINT) engine=innodb;

The segment for segity102 is sql_row_add, which contains an SQL fragment:
'NAME' (TYPE), When the valpoints are replaced and the children snippets are nested, these three combined segities output a file containing the following. Note the generator performs the extra step of formatting segity102 by removing the trailing comma.
create table 'employee' ('firstname' varchar(255)) engine=innodb;

The generator then follows a similar process to fill the other files with relevant code. Upon completion, the generator outputs the files to the developer.

Generator Program

The attached computer program listing appendix contains one embodiment of the present invention's generator program written in PHP. This embodiment contains idiosyncrasies for generating a PHP computer program document.

Additional Considerations

Those skilled in the pertinent art will recognize that the names of attributes, variables, and functions in this disclosure may be changed.

The present invention optionally comprises one or more programs, on one or more computing devices, executed separately or at once. The present invention is optionally embodied in computer software, computer hardware, or a combination of both.

The present invention is optionally integrated with Git, Mercurial, or another version control system.

The present invention is optionally integrated with an SDK, IDE, word processor, or other text editor.

The present invention is optionally embodied as a development and debugging tool for architecting rulesets and segment sets. This embodiment optionally visualizes relationships between entities, rules, and segments.

```
<segity type="file_sql" filename="create.sql" id="100">
<segity type="sql_table_add" name="employee" id="101" parent="100">
<segity type= "sql_row_add" name="firstname" type="varchar(255)" id="102" parent="101">
<segity type="file_php" filename="employee_add.php" id="200">
<segity type="php_exec" id="201" parent="200" order="1">
<segity type="html" id="202" parent= "200" order="2">
<segity type="php_row_add" table="employee" id="300" parent= "201">
<segity type="php_col_input" table="employee" column="firstname" id="400" parent="300">
<segity type="html_form" title="Add Employee" action="employee_add.php" parent="202" id="500">
<segity type="html_input" type="text" name="firstname" id="600" parent="500">
```

The present invention optionally generates program documents in a future programming language optimized for one or more aspects of the present invention.

The specification entities are optionally constructed on a website, mobile application, desktop application, or other GUI interface.

The present invention is optionally combined with a conventional templating engine.

The present invention optionally accepts a specification entity representing a custom function call (or similar) to be incorporated at a given location in the generated program document.

The present invention optionally comprises segments comprising program instructions that integrate third party services and APIs into the generated computer program document. Example integrated third party services include email, text messaging, instant messaging, group collaboration tools, social networking, identity, Active Directory, OAuth, payment processing, cloud software, cloud data, and cloud hosting.

The present invention optionally generates a computer program relating to Bitcoin, Ethereum, or other blockchain technologies.

The present invention is optionally combined with code libraries.

The present invention optionally validates the specification entities. Validation may be implemented to varying degrees. The present invention necessarily validates the syntax of the specification entities according to the given syntax. The present invention preferably validates the syntax of the generated program according to its programming language. However, the present invention may not necessarily validate that the specification entities will produce a useful or functional program. The present invention may generate a syntactically correct, but useless program. In some cases, it may be impossible for the present invention to validate the usefulness or functionality of the generated program.

Refactoring in the present invention is typically done by processing the same specification with a new ruleset or segment set or both.

In one embodiment, the method of the present invention is reversed. This embodiment accesses a document, breaks it down to component segments, extracts value strings from the segments, and forms specification entities from those values.

Optionally, the document is generated with designated placeholders for custom code or text. Upon regeneration, the customized previously generated document is additionally inputted into the generator program to extract the custom code and insert it into corresponding places in the newly generated document.

Strings are optionally encoded in ASCII, Unicode, UTF-8, UTF-16, UTF-32, or other character encoding.

Common computer-readable mediums include flash memory, ROM memory, EPROM memory, EEPROM memory, RAM memory, registrars, hard disks, hard drives, removable discs, CDs, DVDs, Blue-Rays, optical discs, floppy disks, magnetic discs, magnetic tape, and Solid State Drives (SSD) among others.

Common programming languages include ActionScript, Ada, Arc, AWK, Bash, BASIC, C, C++, C#, C Shell, Clojure, COBOL, ColdFusion, Elm, Erlang, Fortran, Go, Haskell, HTML, Java, JavaScript, Julia, Lisp, Objective-C, OCaml, Opal, Perl, PHP, Pico, PowerShell, Prolog, Python, Qbasic, Ruby, Rust, SQL, Swift, TypeScript, Visual Basic, WebAssembly, Wolfram, XML, and XQuery among others.

The present invention is optionally embodied in any capable programming language. This disclosure gives examples of PHP code. PHP itself could be considered a templating language as it was designed to execute commands within HTML markup. However, the present invention does not rely on any templating features within PHP. Nothing in this disclosure should be construed to suggest that the present invention relies on PHP templates or is limited to embodiment in PHP.

Optionally, the present invention is embodied in JavaScript and executed in the constructor's web browser.

For grammatical simplification, this disclosure treats the phrase "the plurality of Xs" as a plural noun, rather than a singular noun. As such, this disclosure uses the wording "the plurality of Xs are" rather than "the plurality of Xs is."

An operating system controls the execution of other computer programs, running of the PSO platform, and provides scheduling, input-output control, file and data management, memory management, and communication control and related services. The operating system may be, for example Windows (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), Apple OS X, iOS and variants thereof (available from Apple, Inc. of Cupertino, Calif.), or the like.

The method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, a Solid-State Drive, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MS SQL, Access, MySQL, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server include a CPU component, a graphics component, memory, non-removable storage, removable storage, Network Interface, including one or more connections to a fixed network, and SQL database(s). Included in the memory, is an operating system, a SQL server or other database engine, and computer programs/software.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

What is claimed is:

1. A computer-implemented method for generating a document within a targeted domain, the method comprising:
    accessing a specification for the document, the specification comprising a plurality of specification entities that comprise values to be included in the document;
    applying a domain ruleset to convert the plurality of specification entities to a plurality of segment entities that comprise the values from the specification entities, wherein the domain ruleset comprises predefined rules for processing specification entities for documents within the targeted domain;
    processing the plurality of segment entities to populate corresponding predefined segments from a segment set by inserting values from the segment entities into the predefined segments; wherein the predefined segments in the segment set comprise fragments of a document within the targeted domain and further comprise value insertion points for the insertion of values into the predefined segments; and
    assembling the segments according to the ruleset, thereby generating the document.

2. The computer-implemented method of claim 1 wherein at least some of the segment entities each comprise values from two different specification entities.

3. The computer-implemented method of claim 1 wherein assembling the segments comprises arranging at least some of the segments according to values in the corresponding segment entities.

4. The computer-implemented method of claim 3 wherein at least some values in the corresponding segment entities used for arranging the segments are determined at least in part by values in the specification entities.

5. The computer-implemented method of claim 3 wherein at least some of the segment entities comprise values assigning parent-child relationships among the segment entities; and assembling the segments comprises recursively nesting child segments into value insertion points in parent segments according to the parent-child relationships in the corresponding segment entities.

6. The computer-implemented method of claim 1 wherein the targeted domain is a computer program in a computer programming language, the predefined segments comprise program instructions in the computer programming language, and the generated document is a computer program in the computer programming language.

7. The computer-implemented method of claim 6 further comprising: compiling the generated computer program.

8. The computer-implemented method of claim 1 wherein the targeted domain is a legal document, the predefined segments comprise legal language, and the generated document is a legal document.

9. A computer system for generating a document within a targeted domain, the computer system comprising:
    a data storage device that stores:
        a specification for the document, the specification comprising a plurality of specification entities that comprise values to be included in the document;
        a domain ruleset comprising predefined rules for processing specification entities for documents within the targeted domain; and
        a segment set comprising predefined segments, the predefined segments comprising fragments of a document within the targeted domain and further comprising value insertion points for the insertion of values into the segment; and
    a processor executing program instructions configured to:
        apply the domain ruleset to convert the plurality of specification entities to a plurality of segment entities that comprise the values from the specification entities;
        process the plurality of segment entities to populate the segments by inserting values from the segment entities; and
        assemble the segments according to the ruleset, thereby generating the document.

10. A non-transitory computer-readable storage medium storing executable computer program instructions for generating a document within a targeted domain, the instructions executable by a computer system and causing the computer system to perform a method comprising:
- accessing a specification for the document, the specification comprising a plurality of specification entities that comprise values to be included in the document;
- applying a domain ruleset to convert the plurality of specification entities to a plurality of segment entities that comprise the values from the specification entities, wherein the domain ruleset comprises predefined rules for processing specification entities for documents within the targeted domain;
- processing the plurality of segment entities to populate the segments by inserting values from the segment entities; wherein the predefined segments in the domain segment set comprise fragments of documents within the targeted domain and further comprise value insertion points for the insertion of values into the segment; and
- assembling the segments according to the ruleset, thereby generating the document.

* * * * *